(12) United States Patent
Khoshnevisan et al.

(10) Patent No.: US 11,617,179 B2
(45) Date of Patent: Mar. 28, 2023

(54) INDICATION OF A RANDOM ACCESS TRANSMISSION BEAM

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/244,809

(22) Filed: Apr. 29, 2021

(65) Prior Publication Data
US 2022/0353857 A1   Nov. 3, 2022

(51) Int. Cl.
*H04W 72/04*   (2009.01)
*H04W 72/044*   (2023.01)
*H04W 74/08*   (2009.01)

(52) U.S. Cl.
CPC ....... *H04W 72/046* (2013.01); *H04W 72/042* (2013.01); *H04W 74/08* (2013.01)

(58) Field of Classification Search
CPC . H04W 72/046; H04W 72/042; H04W 74/08; H04W 16/28; H04W 4/02; H04W 72/04; H04W 74/26
See application file for complete search history.

(56) References Cited

U.S. PATENT DOCUMENTS

| | | | | |
|---|---|---|---|---|
| 2018/0027594 A1* | 1/2018 | Nagaraja | ................ | H04B 7/088 370/329 |
| 2020/0029292 A1* | 1/2020 | Zou | ...................... | H04W 56/001 |
| 2020/0275479 A1* | 8/2020 | Peisa | ................. | H04W 74/0833 |
| 2020/0374806 A1* | 11/2020 | Manolakos | ........... | H04W 64/00 |
| 2021/0410221 A1* | 12/2021 | Zhang | ................... | H04L 5/0048 |
| 2022/0030620 A1* | 1/2022 | Cirik | ...................... | H04W 72/14 |

* cited by examiner

*Primary Examiner* — Mewale A Ambaye
(74) *Attorney, Agent, or Firm* — Holland & Hart LLP

(57) ABSTRACT

Methods, systems, and devices for wireless communications are described that support enhanced methods for indicating random access transmission beams. For example, a user equipment (UE) may transmit a set of uplink reference signals to a base station, each uplink reference signal corresponding to a respective uplink beam. The base station may receive the uplink reference signals and may determine signal qualities for the uplink beams. The base station may identify one or more uplink beams for the UE to use in subsequent random access procedures and may transmit control signaling to the UE indicating one or more beams for random access procedure transmissions. The UE may transmit random access messages to the base station using an uplink beam selected based on the control signaling received from the base station.

30 Claims, 16 Drawing Sheets

INDICATION OF A RANDOM ACCESS TRANSMISSION BEAM

FIELD OF TECHNOLOGY

The following relates to wireless communications, and more specifically to an indication of a random access transmission beam.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may perform a random access procedure, for example, to establish or reestablish a connection with a base station. As part of the random access procedure, the UE may transmit a random access message to a base station using an uplink beam, which may be based on a downlink beam used to receive signals from the base station.

SUMMARY

The described techniques relate to improved methods, systems, devices, and apparatuses that support indication of a random access transmission beam. Generally, the described techniques provide for a base station indicating random access transmission beams for a user equipment (UE). In some examples, the base station may configure the UE with a random access uplink beam, which may be configured independently of downlink beams or transmissions. For example, the UE may transmit a set of one or more reference signals to the base station, where each reference signal may be transmitted via a respective uplink beam. The base station may receive the reference signals and may identify one or more uplink beams for random access procedures. The base station may identify the one or more uplink beams based on a signal quality associated with each of the reference signals transmitted by the UE. The base station may transmit control signaling indicating the one or more identified uplink beams for the UE to use in subsequent random access procedures. In some examples, the UE may use the one or more uplink beams indicated by the control signaling for transmission of a random access message. In other examples, the UE may determine to use an uplink beam other than the one or more uplink beams, for example, based on measuring downlink signals from the base station.

A method for wireless communication at a user equipment (UE) is described. The method may include transmitting a set of multiple uplink reference signals associated with a set of uplink beams, where each uplink reference signal of the set of multiple uplink reference signals is associated with a respective uplink beam of the set of uplink beams, receiving, from a base station and at least in part in response to transmitting the set of multiple uplink reference signals, control signaling indicating one or more uplink beams from the set of uplink beams for the UE to use in a random access procedure, and transmitting a first random access message using an uplink beam selected based on the indication of the one or more uplink beams.

An apparatus for wireless communication at a UE is described. The apparatus may include a processor, memory coupled with the processor, and instructions stored in the memory. The instructions may be executable by the processor to cause the apparatus to transmit a set of multiple uplink reference signals associated with a set of uplink beams, where each uplink reference signal of the set of multiple uplink reference signals is associated with a respective uplink beam of the set of uplink beams, receive, from a base station and at least in part in response to transmitting the set of multiple uplink reference signals, control signaling indicating one or more uplink beams from the set of uplink beams for the UE to use in a random access procedure, and transmit a first random access message using an uplink beam selected based on the indication of the one or more uplink beams.

Another apparatus for wireless communication at a UE is described. The apparatus may include means for transmitting a set of multiple uplink reference signals associated with a set of uplink beams, where each uplink reference signal of the set of multiple uplink reference signals is associated with a respective uplink beam of the set of uplink beams, means for receiving, from a base station and at least in part in response to transmitting the set of multiple uplink reference signals, control signaling indicating one or more uplink beams from the set of uplink beams for the UE to use in a random access procedure, and means for transmitting a first random access message using an uplink beam selected based on the indication of the one or more uplink beams.

A non-transitory computer-readable medium storing code for wireless communication at a UE is described. The code may include instructions executable by a processor to transmit a set of multiple uplink reference signals associated with a set of uplink beams, where each uplink reference signal of the set of multiple uplink reference signals is associated with a respective uplink beam of the set of uplink beams, receive, from a base station and at least in part in response to transmitting the set of multiple uplink reference signals, control signaling indicating one or more uplink beams from the set of uplink beams for the UE to use in a random access procedure, and transmit a first random access message using an uplink beam selected based on the indication of the one or more uplink beams.

In some examples of the method, apparatuses, and non-transitory computer-readable medium described herein, receiving the control signaling indicating the one or more uplink beams may include operations, features, means, or instructions for receiving an indication of a set of random access occasions associated with the one or more uplink beams.

Some examples of the method, apparatuses, and non-transitory computer-readable medium described herein may further include operations, features, means, or instructions for receiving the control signaling indicating the one or more uplink beams may be based on the UE being configured in a deployment configuration where uplink beams of the UE may be decoupled from downlink beams of the UE.

In some examples of the method, apparatuses, and non-transitory computer-readable medium described herein, receiving the control signaling indicating the one or more uplink beams may include operations, features, means, or instructions for receiving an indication of a first set of uplink beams for the UE to use in a contention-based random access procedure and receiving an indication of a second set of uplink beams for the UE to use in a contention-free random access procedure.

In some examples of the method, apparatuses, and non-transitory computer-readable medium described herein, receiving the control signaling indicating the one or more uplink beams may include operations, features, means, or instructions for receiving an indication of a first set of uplink beams for the UE to use in a two-step random access procedure and receiving an indication of a second set of uplink beams for the UE to use in a four-step random access procedure.

In some examples of the method, apparatuses, and non-transitory computer-readable medium described herein, receiving the control signaling indicating the one or more uplink beams may include operations, features, means, or instructions for receiving an indication of a first set of uplink beams for the UE to use in a first type of random access procedure associated with a first triggering condition and receiving an indication of a second set of uplink beams for the UE to use in a second type of random access procedure associated with a second triggering condition.

Some examples of the method, apparatuses, and non-transitory computer-readable medium described herein may further include operations, features, means, or instructions for receiving a set of downlink reference signals via a set of downlink beams, measuring a path loss for one or more of the set of downlink beams based on receiving the set of downlink reference signals, and determining, based on a comparison of the path loss to a path loss threshold, whether to use a first uplink beam of the one or more uplink beams or a second uplink beam corresponding to one of the set of downlink beams as the uplink beam for the first random access message.

Some examples of the method, apparatuses, and non-transitory computer-readable medium described herein may further include operations, features, means, or instructions for receiving an indication of the path loss threshold from the base station, where determining whether to use the first uplink beam or the second uplink beam may be based on receiving the indication of the path loss threshold.

In some examples of the method, apparatuses, and non-transitory computer-readable medium described herein, the UE may be configured with a first uplink carrier associated with a downlink carrier and the method, apparatuses, and non-transitory computer-readable medium may include further operations, features, means, or instructions for receiving control signaling indicating a second uplink carrier associated with the downlink carrier, the second uplink carrier configured for supplementary uplink and determining to use one of the one or more uplink beams as the uplink beam for the first random access message based on determining to transmit the first random access message via the second uplink carrier.

In some examples of the method, apparatuses, and non-transitory computer-readable medium described herein, the one or more uplink beams include the uplink beam and the method, apparatuses, and non-transitory computer-readable medium may include further operations, features, means, or instructions for transmitting the first random access message using an accumulated timing advance associated with the one or more uplink beams.

Some examples of the method, apparatuses, and non-transitory computer-readable medium described herein may further include operations, features, means, or instructions for receiving a set of downlink reference signals via a set of downlink beams and selecting the uplink beam based on the indication of the one or more uplink beams instead of based on the set of downlink beams.

In some examples of the method, apparatuses, and non-transitory computer-readable medium described herein, receiving the control signaling indicating the one or more uplink beams may include operations, features, means, or instructions for receiving an indication of one or more uplink reference signals of the set of multiple uplink reference signals, each of the one or more uplink reference signals associated with a corresponding uplink beam of the one or more uplink beams.

Some examples of the method, apparatuses, and non-transitory computer-readable medium described herein may further include operations, features, means, or instructions for transmitting an indication of a UE capability for using an uplink beam that may be unassociated with downlink beams used for communications between the base station and the UE, where receiving the indication of the one or more uplink beams may be based at least in part the indication of the UE capability.

In some examples of the method, apparatuses, and non-transitory computer-readable medium described herein, transmitting the set of multiple uplink reference signals may include operations, features, means, or instructions for transmitting the set of multiple uplink reference signals via a supplementary uplink carrier or an uplink node in communication with the base station.

A method for wireless communication at a base station is described. The method may include receiving an indication of a signal quality of a set of multiple uplink reference signals associated with a set of uplink beams, where each uplink reference signal of the set of multiple uplink reference signals is associated with a respective uplink beam of the set of uplink beams, transmitting, to a UE and at least in part in response to receiving the indication of the signal quality, control signaling indicating one or more uplink beams from the set of uplink beams for the UE to use in a random access procedure, and receiving an indication of a first random access message that is transmitted using an uplink beam selected based on the indication of the one or more uplink beams.

An apparatus for wireless communication at a base station is described. The apparatus may include a processor, memory coupled with the processor, and instructions stored in the memory. The instructions may be executable by the processor to cause the apparatus to receive an indication of a signal quality of a set of multiple uplink reference signals associated with a set of uplink beams, where each uplink reference signal of the set of multiple uplink reference signals is associated with a respective uplink beam of the set of uplink beams, transmit, to a UE and at least in part in response to receiving the indication of the signal quality, control signaling indicating one or more uplink beams from the set of uplink beams for the UE to use in a random access procedure, and receive an indication of a first random access message that is transmitted using an uplink beam selected based on the indication of the one or more uplink beams.

Another apparatus for wireless communication at a base station is described. The apparatus may include means for receiving an indication of a signal quality of a set of multiple uplink reference signals associated with a set of uplink beams, where each uplink reference signal of the set of multiple uplink reference signals is associated with a respective uplink beam of the set of uplink beams, means for transmitting, to a UE and at least in part in response to receiving the indication of the signal quality, control signaling indicating one or more uplink beams from the set of uplink beams for the UE to use in a random access procedure, and means for receiving an indication of a first random access message that is transmitted using an uplink beam selected based on the indication of the one or more uplink beams.

A non-transitory computer-readable medium storing code for wireless communication at a base station is described. The code may include instructions executable by a processor to receive an indication of a signal quality of a set of multiple uplink reference signals associated with a set of uplink beams, where each uplink reference signal of the set of multiple uplink reference signals is associated with a respective uplink beam of the set of uplink beams, transmit, to a UE and at least in part in response to receiving the indication of the signal quality, control signaling indicating one or more uplink beams from the set of uplink beams for the UE to use in a random access procedure, and receive an indication of a first random access message that is transmitted using an uplink beam selected based on the indication of the one or more uplink beams.

In some examples of the method, apparatuses, and non-transitory computer-readable medium described herein, transmitting the control signaling indicating the one or more uplink beams may include operations, features, means, or instructions for transmitting an indication of a set of random access occasions associated with the one or more uplink beams.

Some examples of the method, apparatuses, and non-transitory computer-readable medium described herein may further include operations, features, means, or instructions for transmitting the control signaling indicating the one or more uplink beams may be based on the UE being configured in a deployment configuration where uplink beams of the UE may be decoupled from downlink beams of the UE.

In some examples of the method, apparatuses, and non-transitory computer-readable medium described herein, transmitting the control signaling indicating the one or more uplink beams may include operations, features, means, or instructions for transmitting an indication of a first set of uplink beams for the UE to use in a contention-based random access procedure and transmitting an indication of a second set of uplink beams for the UE to use in a contention-free random access procedure.

In some examples of the method, apparatuses, and non-transitory computer-readable medium described herein, transmitting the control signaling indicating the one or more uplink beams may include operations, features, means, or instructions for transmitting an indication of a first set of uplink beams for the UE to use in a two-step random access procedure and transmitting an indication of a second set of uplink beams for the UE to use in a four-step random access procedure.

In some examples of the method, apparatuses, and non-transitory computer-readable medium described herein, transmitting the control signaling indicating the one or more uplink beams may include operations, features, means, or instructions for transmitting an indication of a first set of uplink beams for the UE to use in a first type of random access procedure associated with a first triggering condition and transmitting an indication of a second set of uplink beams for the UE to use in a second type of random access procedure associated with a second triggering condition.

Some examples of the method, apparatuses, and non-transitory computer-readable medium described herein may further include operations, features, means, or instructions for transmitting, to the UE, a set of downlink reference signals via a set of downlink beams and transmitting an indication of a path loss threshold for the set of downlink beams, where the uplink beam may be based on the path loss threshold.

Some examples of the method, apparatuses, and non-transitory computer-readable medium described herein may further include operations, features, means, or instructions for receiving an indication of a UE capability for using an uplink beam that may be unassociated with downlink beams used for communications between the base station and the UE, where transmitting the indication of the one or more uplink beams may be based at least in part the indication of the UE capability.

Some examples of the method, apparatuses, and non-transitory computer-readable medium described herein may further include operations, features, means, or instructions for receiving the indication of the signal quality of the set of multiple uplink reference signals, the indication of the first random access message, or both, from an uplink node in communication with the base station.

DETAILED DESCRIPTION

Figure 1:
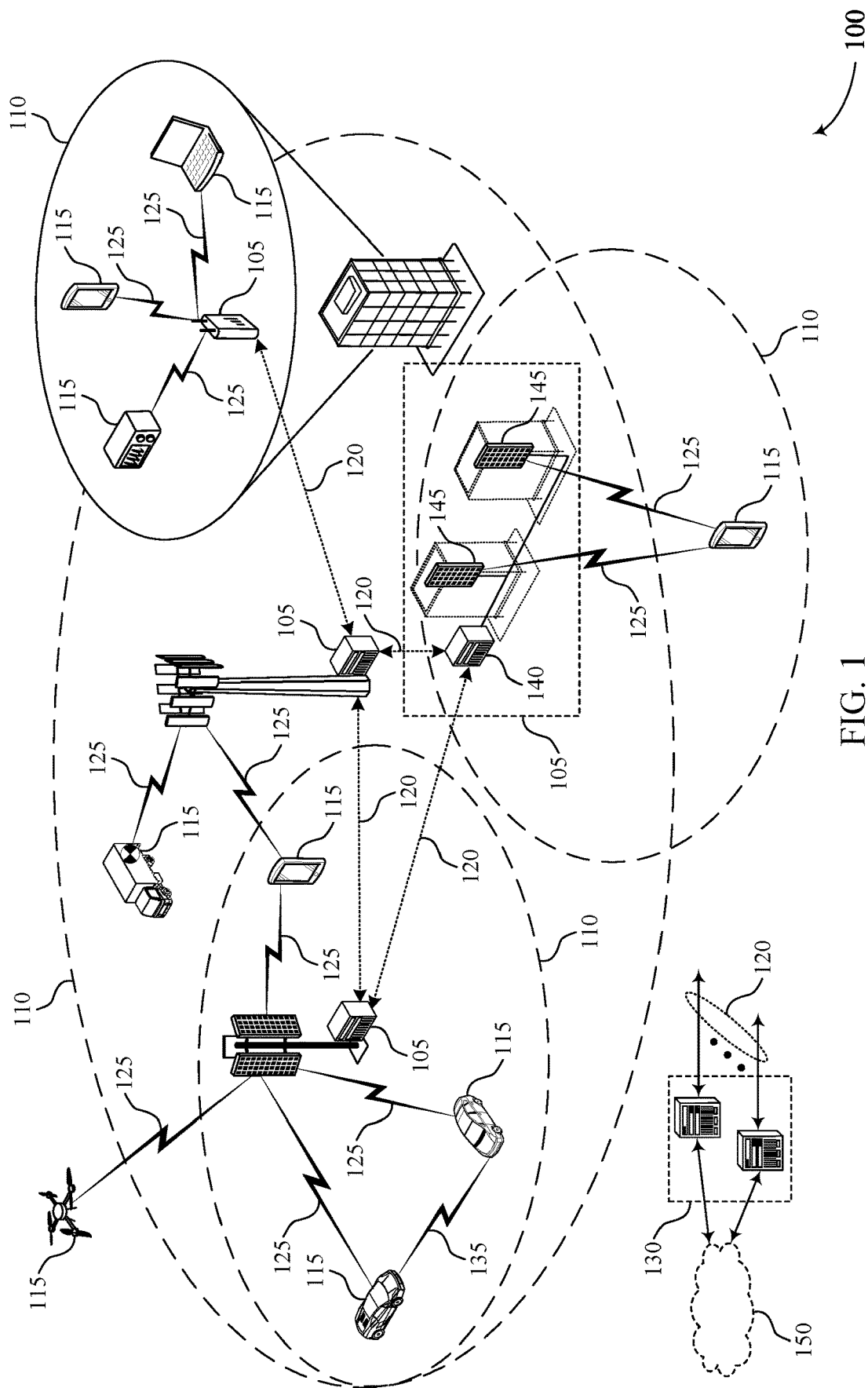
FIGS. 1 and 2 illustrate examples of wireless communications systems that support indications of random access transmission beams in accordance with aspects of the present disclosure.

Some wireless communications systems may include communication devices, such as user equipment (UE), base stations (for example, an eNodeB (eNB), a next-generation NodeB or a giga-NodeB, any of which may be referred to as a gNB, a parent node, or some other base station), and uplink nodes (for example, a repeater node, a daughter node, or any other device configured with uplink capabilities). In some cases, a UE may perform a random access procedure, for example, due to the UE transitioning out of an idle or inactive state, the UE requesting connection reestablishment, or the like. As part of the random access procedure, the UE may transmit a random access message to a base station using an uplink beam. In some cases, the UE may select the uplink beam based on a downlink beam used to receive signals (e.g., synchronization signal blocks (SSBs), channel state information reference signals (CSI-RSs)) from the base station.

However, in some cases, selecting an uplink beam based on a downlink beam may be deficient, for example, in an uplink dense deployment system or in a system utilizing supplementary uplink (SUL) carriers. In an uplink dense deployment system, the uplink beam may be decoupled from (e.g., may be pointing in a different direction or may otherwise be different than) the downlink beam. For example, the UE may receive signals from the base station via a downlink beam and may transmit signals to an uplink node via an uplink beam. In such a case, the uplink node may be separate from (e.g., may not be co-located with) the base station. As such, the uplink node may transmit (or forward) the signals from the UE to the base station, for example, using a backhaul link. Additionally or alternatively, the UE may communicate with the base station via a SUL carrier (e.g., using transmissions without downlink portions). In some examples, a beam used for an SUL may point in a different direction than the downlink beam. Thus, in an uplink dense deployment system or a system using SUL carriers, using an uplink beam corresponding to a downlink beam may result in lower communication quality and, in some cases, in a failure to receive the random access message at the base station.

Techniques, systems, and devices are described herein to provide for indicating uplink beams for random access transmissions independent of a downlink beam. The base station may configure the UE with a random access uplink beam, which may be configured independently of downlink beams or transmissions. For example, the UE may transmit a set of one or more reference signals (e.g., sounding reference signals (SRSs)) to the base station (e.g., either directly or via an uplink node), where each SRS may be transmitted via a respective uplink beam. The base station may receive the SRSs (e.g., either directly or through a backhaul connection with an uplink node) and may identify one or more uplink beams for random access procedures.

The base station may identify the one or more uplink beams based on a signal quality associated with each of the reference signals transmitted by the UE. The base station may transmit control signaling indicating the one or more identified uplink beams for the UE to use in subsequent random access procedures (e.g., other than initial access procedures). In some examples, the UE may use the one or more uplink beams indicated by the control signaling for transmission of a random access message. In other examples, the UE may determine to use an uplink beam (e.g., a direct beam to the base station) other than the one or more uplink beams, for example, based on measuring downlink signals from the base station.

Aspects of the disclosure are initially described in the context of wireless communications systems. Aspects of the disclosure are then described in the context of resource allocation schemes and a process flow. Aspects of the disclosure are further illustrated by and described with reference to apparatus diagrams, system diagrams, and flowcharts that relate to indication of a random access transmission beam.

FIG. 1 illustrates an example of a wireless communications system 100 that supports indication of a random access transmission beam in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may perform a random access procedure and as part of the random access procedure, the UE 115 may transmit a random access message to a base station 105 using an uplink beam. In some cases, the UE 115 may select the uplink beam based on a downlink beam used to receive signals (e.g., SSBs, CSI-RSs, or the like) from the base station 105. However, in some cases, selecting an uplink beam based on a downlink beam may be deficient, for example, in an uplink dense deployment system or in a system utilizing SUL carriers.

In some examples, the base station 105 may configure the UE 115 with a random access uplink beam, which may be configured independently of downlink beams or transmissions. For example, the UE 115 may transmit a set of one or more reference signals to the base station 105, where each SRS may be transmitted via a respective uplink beam. The base station 105 may receive the SRSs and may identify one or more uplink beams for random access procedures. The base station 105 may identify the one or more uplink beams based on a signal quality associated with each of the reference signals transmitted by the UE 115. The base station 105 may transmit control signaling indicating the one or more identified uplink beams for the UE 115 to use in subsequent random access procedures (e.g., other than initial access procedures). In some examples, the UE 115 may use the one or more uplink beams indicated by the control signaling for transmission of a random access message. In other examples, the UE 115 may determine to use an uplink beam (e.g., a direct beam to the base station) other than the one or more uplink beams, for example, based on measuring downlink signals from the base station 105.

Figure 2:
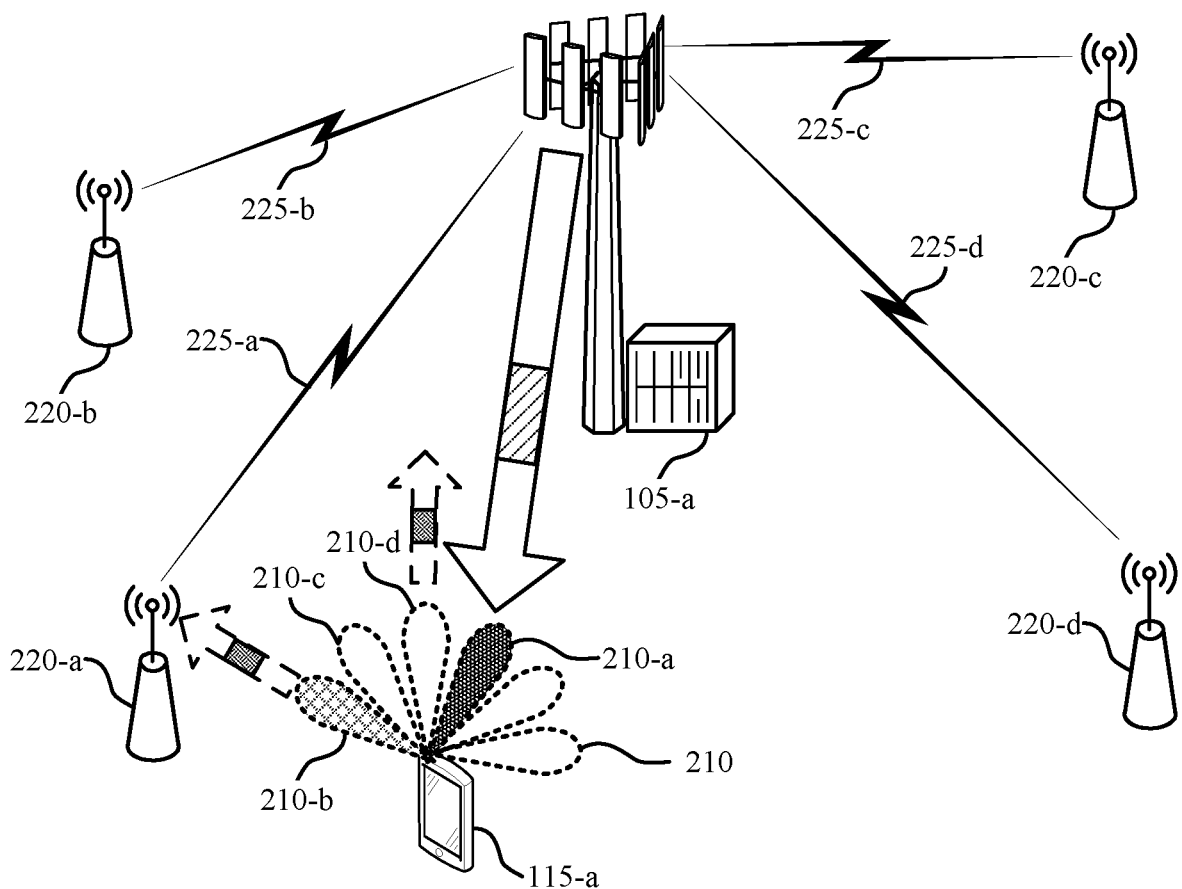

FIG. 2 illustrates an example of a wireless communications system 200 that supports an indication of a random access transmission beam in accordance with aspects of the present disclosure. Wireless communications system 200 may include communications devices such as a base station 105-a and a UE 115-a which may be examples of base stations 105 and UEs 115 respectively as described with reference to FIG. 1. In some cases, wireless communications system 200 may be referred to as an uplink dense deployment system and may include one or more uplink nodes 220 which may be (or may otherwise support functionality for) repeater nodes, daughter nodes, or any other device configured with uplink capabilities. Wireless communications system 200 may support techniques for the base station 105-a to configure the UE 115-a with one or more uplink beams for performing random access procedures.

In some cases, the UE 115-a may communicate with the base station 105-a using one or more beams 210. For example, the base station 105-a may transmit downlink signals to the UE 115-a and the UE may receive the downlink signals using beam 210-a (e.g., a receive beam 210-a or a downlink beam 210-a). In some cases, the UE 115-a may transmit uplink signals to the base station 105-a directly, via an uplink beam 210 or a transmit beam 210, such as a beam that corresponds to (e.g., has a same beam direction as) beam 210-a (e.g., which may in some cases be represented by beam 210-a). In other cases, the UE 115-a may transmit uplink signals to an uplink node 220, such as uplink node 220-a, for example, using beam 210-b. In such cases, the uplink node 220-a may transmit (or relay) the uplink signals to the base station 105-a using one or more communication links 225 (e.g., wireless or wired communication links 225) which may be equivalently referred to as backhaul links 225.

The UE 115-a may be in a connected mode (e.g., an RRC connected mode) with the base station 105-a. For example, the UE 115-a may have previously performed an initial random access procedure (e.g., RRC connection establishment) with the base station 105-a such that the UE 115-a may receive RRC messages from the base station 105-a and communicate with the base station 105-a (e.g., in the uplink or the downlink).

In some cases, the connection between the UE 115-a and the base station 105-a may be interrupted, for example, due to one or more events such as the UE 115-a transitioning into an idle or inactive state, a beam failure detection (BFD), a handover procedure, or the like. To re-establish a connection with the base station 105-a, the UE 115-a may transmit a random access message (e.g., including one or more random access preambles) to the base station 105-a, for example, using a beam 210. A random access procedure may be, for example, a four step random access procedure (e.g., a Type 1 procedure, which includes a message 1 (MSG1)) or a two step random access procedure (e.g., a Type 2 procedure, which includes a message A (MSGA)). Both types of random access procedures may support contention based random access (CBRA) and contention free random access (CFRA). A random access procedure may be initiated at the UE 115-a (e.g., the UE 115-a may transmit a random access message) by one or more triggers.

For example, a random access procedure may be triggered by a request for a random access transmission from a higher layer at the UE 115-a (e.g., a MAC or RRC layer), or by a received physical downlink control channel (PDCCH) order (e.g., at layer 1). A PDCCH order may represent a downlink control information (DCI) transmission having format 1_0, with a CRC scrambled with a cell radio network temporary identifier (C-RNTI), and with a frequency domain resource allocation (FDRA) field having one or more values each set to "1." If the request to initiate the random access is from the RRC layer, the random access procedure may be performed as an initial access procedure (e.g., to exit an RRC idle state), an RRC connection reestablishment procedure, or a handover procedure (e.g., a request by RRC upon synchronous reconfiguration). If the request is from the MAC layer, the random access procedure may be performed as a beam failure recovery (BFR) procedure for a primary cell (PCell) or primary secondary cell (PSCell), may be performed in response to a scheduling request failure, may be performed if uplink data arrives during an RRC connected state when there are no uplink resources (e.g., physical uplink control channel (PUCCH) resources) available for a scheduling request, or may be performed if uplink data arrives during an RRC connected state when uplink synchronization status is "non-synchronized."

In some cases, UE 115-a and base station 105-a may communicate in the uplink via one or more uplink nodes 220 (e.g., in an uplink dense deployment scenario). In such cases, UE 115-a may transmit uplink signals and/or channels to an uplink receive point, which may be represented by an uplink node 220 (e.g., uplink node 220-a). The uplink nodes 220 may be connected to base station 105-a (e.g., a macro node) via backhaul links 225 (e.g., wired or wireless links), such that one or more uplink nodes 220 may receive the uplink signals and/or channels from UE 115-a and forward associated uplink data or uplink information to base station 105-a (e.g., transmit an indication of the uplink data or information, such as via the backhaul link 225). Downlink signals and/or channels may be transmitted to UE 115-a from base station 105-a (e.g., a macro node, serving cell, serving base station 105), which may represent a different communication node (e.g., at a different location) than any uplink nodes 220 used for uplink communications.

An uplink dense deployment scenario as described herein may improve uplink coverage and/or capacity. For example, using one or more uplink nodes 220 for communications between UE 115-a and base station 105-a may reduce uplink pathloss (e.g., among other examples). The reduction in pathloss may increase uplink communication speed and throughput, which may in turn reduce a bottlenecking effect for the uplink communications (e.g., as compared to downlink communications). Additionally or alternatively, uplink dense deployment may reduce deployment cost and/or complexity for network entities (e.g., for uplink nodes 220), while increasing coverage, because the uplink nodes 220 may not be configured to transmit downlink signals or perform configurations. For example, each uplink node 220 may be configured to receive uplink signals (e.g., from UE 115-a) and send the uplink signals to base station 105-a (e.g., with or without some processing).

In some cases, UE 115-a and base station 105-a may communicate in the uplink via a supplementary uplink (SUL) carrier. In such cases, UE 115-a may be configured with two uplink carriers for one downlink carrier of a same serving cell, where uplink transmissions on the two uplink carriers may not be simultaneous (e.g., may never be simultaneous). One of the uplink carriers may be configured as SUL (e.g., such that the other uplink carrier may be a non-SUL or normal uplink (NUL) carrier), and UE 115-a may choose which uplink carrier to use for uplink transmissions. In one example, UE 115-a may be configured with a TDD band (e.g., TDD uplink carrier) and SUL carrier, such that UE 115-a may transmit uplink information on either the TDD band (e.g., non-SUL or NUL carrier) or on the SUL carrier.

In cases where UE 115-a communicates with base station 105-a in the uplink via an uplink node 220 (e.g., uplink node 220-a), uplink transmit and receive beams 210 may be associated with the uplink node 220 (e.g., and not with base station 105-a). Similarly, in cases where UE 115-a communicates with base station 105-a using an SUL carrier, uplink transmit and receive beams 210 for the SUL carrier may not be associated with any corresponding beams 210 for the associated downlink carrier. As such, when UE 115-a communicates in the uplink via an uplink node 220, or via an SUL carrier, a beam correspondence may not exist between downlink and uplink beams 210. A downlink reference signal (e.g., CSI-RS and/or SSB) may therefore not be used to indicate an uplink beam 210, for example, because the uplink and downlink beams 210 may not correspond to each other in these communication scenarios. For example, a beam 210 for a random access message may not be based on a beam 210 used to receive system information (e.g., SSBs, CSI-RSs, or the like) from the base station 105-a, such an in other systems.

According to techniques as described herein, the base station 105-a may transmit control signaling 230 to the UE 115-a, which may configure the UE 115-a with one or more beams 210 for transmitting random access messages. In some examples, the base station 105-a may transmit the control signaling 230 based on receiving one or more uplink reference signals from the UE 115-a. For example, the UE 115-a may transmit a set of SRSs to the base station 105-a (e.g., SRSs with a usage set to beam management), where the UE 115-a may transmit each SRS using a respective beam 210 (e.g., based on the SRSs having a usage set to beam management). For example, the UE 115-a may transmit an SRS using beam 210-a, another SRS using beam 210-c, and so forth, with one or more other beams 210 that are each associated with a respective SRS. The base station 105-a may receive the uplink reference signals or an indication of a signal quality thereof (e.g., either directly or from an uplink node 220, via a backhaul link 225), and may determine one or more preferred beams 210 for the UE 115-a for transmission of random access messages (e.g., based on the signal quality of the uplink reference signals).

For example, the base station 105-a may receive an indication of a signal quality for each uplink reference signal (e.g., either directly or via an uplink node 220), such that the base station 105-a may identify beams 210 associated with a relatively higher signal quality (e.g., based on a signal quality threshold). In some examples, the base station 105-a may transmit control signaling 230 indicating one or more beams 210 from a set of uplink beams for the UE 115-a to use in a random access procedure. For example, the base station 105-a may identify one or more beams 210 associated with a higher signal quality, for example, by transmitting control signaling that points to one or more respective uplink reference signal resources (e.g., an uplink reference signal resource identifier (ID) corresponding to a selected beam 210). The beam(s) 210 may be selected independently or irrespective of an SSB associated with a random access procedure. For example, the selected uplink beam(s) 210 may be unassociated or decoupled from downlink beams 210 used for communications with the base station 105-a.

In some examples, the base station may include an indication of a timing advance (TA) in the control signaling 230. In some examples, the base station 105-a may indicate beams 210 separately for different types of random access procedures (e.g., two step random access and four step random access), for BFR procedures, or one or more other random access procedures. Resource allocations for the uplink reference signals, and the corresponding, associated beams, are described in more detail with reference to FIGS. 3A and 3B.

In some examples, the base station 105-a may transmit the control signaling 230 based on a capability of the UE 115-a. For example, the UE 115-a may transmit, to the base station 105-*a*, an indication of a UE capability, indicating that the UE 115-*a* may be configured to use an uplink beam 210 that is unassociated with downlink beams. For example, the UE capability may indicate that the UE 115-*a* may transmit uplink transmissions in a different direction than, or in a manner otherwise different from communications corresponding to, a downlink beam. Additionally or alternatively, the UE capability may be associated with a type of random access procedure. For example, the UE 115-*a* capability may indicate that the UE 115-*a* may be configured to use beams 210 that are decoupled with downlink beams for one or more of CBRA, CFRA, four step random access, two step random access, or BFR, among other examples.

The UE 115-*a* may receive the control signaling 230 and may select a beam 210 for random access procedures based on the beam(s) indicated by the control signaling 230. In some cases, the UE 115-*a* may receive the control signaling 230 based on the UE capability. In some examples, the UE 115-*a* may determine whether to use the one or more beams 210 indicated in the control signaling 230 for subsequent random access procedures, based on one or more measurements at the UE 115-*a*. For example, a measurement rule may be applicable to random access procedures associated with BFR, or CBRA procedures triggered by a PDCCH order. In some cases, such a rule may not be applicable for CFRA triggered by a PDCCH order, for example, because an SSB index may be indicated by the DCI triggering the PDCCH order (e.g., and there may not be any associated SSB measurements).

For example, the base station 105-*a* may transmit, to the UE 115-*a*, a set of downlink reference signals using one or more downlink beams (not shown). The UE 115-*a* may perform measurements of the downlink reference signals and may determine whether to use the one or more beams 210 indicated by the control signaling 230 based on the measurements. In some examples, the UE 115-*a* may measure a path loss for the downlink beams and may compare each measured path loss to a path loss threshold. For example, the base station 105-*a* may transmit, to the UE 115-*a*, one or more SSBs, CSI-RSs, or the like, using a respective downlink beam for each transmission. The UE 115-*a* may measure a path loss for each downlink beam and may compare each path loss to the path loss threshold. The path loss threshold may be predefined at the UE 115-*a* or indicated to the UE 115-*a* by the base station 105-*a*.

In some examples, the UE 115-*a* may determine that all of the path loss measurements fail to satisfy the path loss threshold. For example, the UE 115-*a* may determine that the path loss for each downlink beam is greater than the path loss threshold. As such, the UE 115-*a* may determine that the downlink beams may not have a high enough signal quality for uplink transmissions and may determine to use the one or more beams 210 indicated by the control signaling 230 for subsequent random access procedures (e.g., because the one or more indicated beams 210 may have a higher signal quality). If the UE 115-*a* determines to use the one or more beams 210 indicated by the control signaling 230, the UE 115-*a* may determine to use an existing, accumulated TA for the one or more beams 210 (e.g., rather than resetting the TA). In some cases, the TA for the one or more beams may be indicated in the control signaling 230. If the UE 115-*a* determines to use an uplink beam corresponding to a downlink beam or receive beam (e.g., not indicated by the control signaling 230), the UE 115-*a* may reset the TA.

In some other examples, the UE 115-*a* may determine that one or more of the downlink beam measurements satisfy the path loss threshold. For example, the UE 115-*a* may determine that the path loss for a downlink beam is less than the path loss threshold. As such, the UE 115-*a* may determine that the downlink beam (or a beam proximal to or corresponding to the downlink beam) is sufficient for both downlink and uplink transmissions, and may determine to use a beam 210 based on the downlink beam for subsequent random access procedures. If the UE 115-*a* determines to use a beam 210 other than the one or more beams 210 indicated by the base station 105-*a*, the UE 115-*a* may reset a TA previously configured for communications between the UE 115-*a* and the base station 105-*a* (e.g., because the TA may apply to communications transmitted via an uplink node 220, instead of transmitted directly to the base station 105-*a*).

Additionally or alternatively, the UE 115-*a* may determine to use the one or more beams 210 indicated in the control signaling 230 based on whether the UE 115-*a* uses an SUL carrier for random access procedures. For example, the UE 115-*a* may use the beams 210 indicated by the control signaling 230 if the UE 115-*a* uses an SUL carrier. If the UE 115-*a* uses a normal uplink (NUL) carrier for random access procedures, the UE 115-*a* may use a beam 210 corresponding to a measured downlink receive beam (e.g., used for measurement of an SSB or CSI-RS) for subsequent random access procedures.

In any of the examples described herein, after selecting one or more beams 210 (e.g., based on the control signaling 230), the UE 115-*a* may transmit a random access message 235 to the base station 105-*a* using the one or more selected beams 210. For example, UE 115-*a* may transmit the random access message 235 to uplink node 220-*a*, via an uplink beam 210-*a*, or may transmit the random access message 235 to the base station 105-*a* via an SUL, and via an uplink beam 210-*d*. In some examples, the UE 115-*a* may transmit more than one random access message 235 using the selected beam(s) 210, for example, based on the type of random access procedure (e.g., may transmit multiple random access messages when performing four step random access). Such random access message transmissions are described in more detail with reference to FIGS. 3A and 3B.

The techniques as described herein may support transmission of random access messages 235 using an enhanced uplink beam scheme at the UE 115-*a* (e.g., using an uplink beam 210 with higher signal quality). These techniques may support an increased reliability for random access message transmissions, which may increase communication quality and decrease communication latency between the UE 115-*a* and the base station 105-*a*.

Figure 3A:
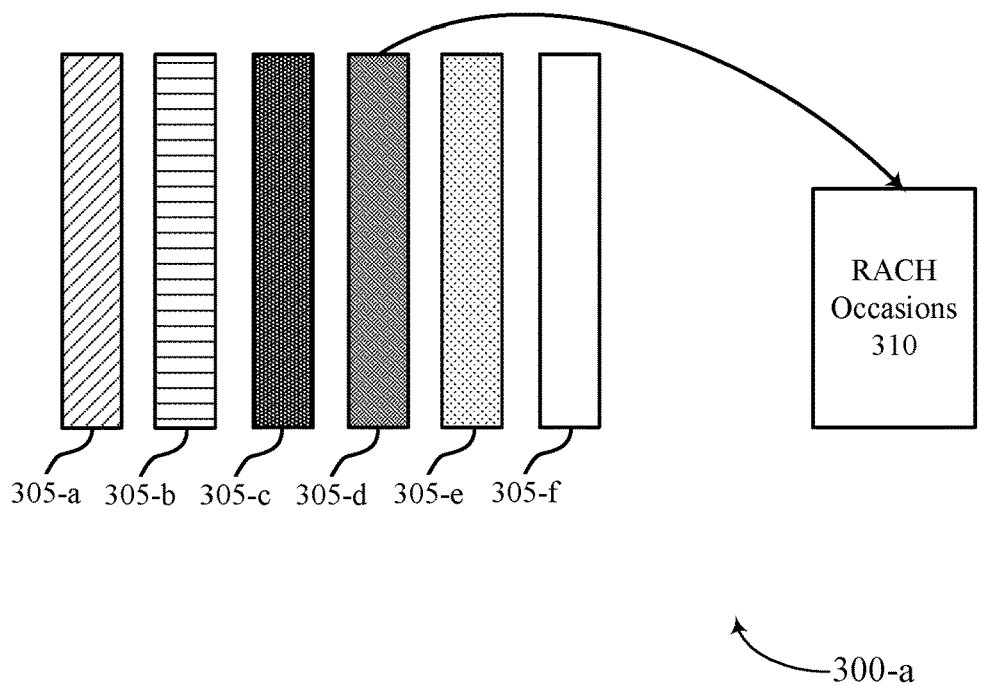
FIGS. 3A and 3B illustrate examples of resource allocation schemes that support indications of random access transmission beams in accordance with aspects of the present disclosure.
Figure 3B:
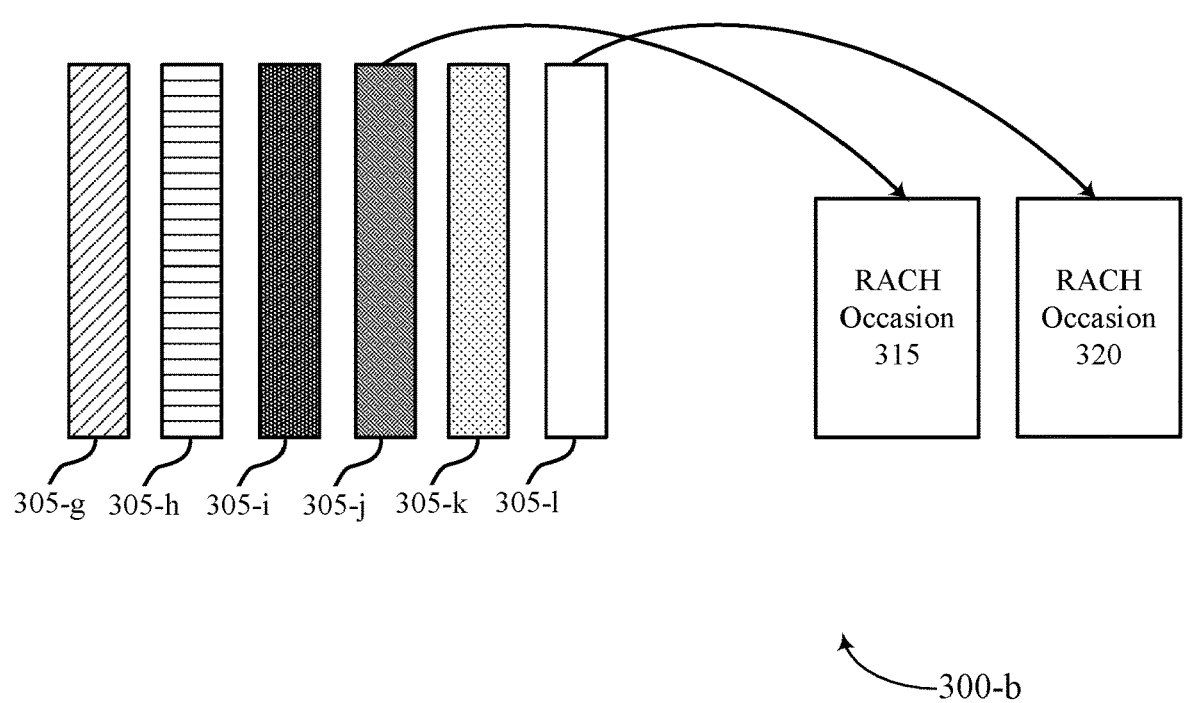

FIGS. 3A and 3B illustrate examples of resource allocation schemes 300-*a* and 300-*b* that support indications of random access transmission beams in accordance with aspects of the present disclosure. In some examples, devices such as those described with reference to FIGS. 1 and 2 may utilize the resource allocation schemes 300-*a* and 300-*b* when configuring resources for random access procedures. For example, a base station 105 may transmit control signaling to a UE 115 indicating one or more beams for one or more random access channel (RACH) occasions using a resource allocation scheme 300. The base station 105 and the UE 115 may represent examples of the corresponding devices described with reference to FIGS. 1 and 2.

In some examples, the base station 105 may transmit control signaling (e.g., RRC signaling, a MAC control element (MAC-CE), a DCI, or the like) to the UE 115 based on previous UE 115 beam sweeping procedures (e.g., SRS transmissions, such as received via an uplink node or an SUL carrier). For example, the base station 105 may transmit control signaling based on receiving one or more uplink reference signals from the UE 115, where the control signaling may indicate one or more uplink beams for random access procedures. For example, the UE 115 may transmit a set of uplink reference signals (e.g., SRSs) to the base station 105, where each uplink reference signal may be transmitted via a corresponding resource that is identified with a respective uplink resource ID 305 (e.g., an SRS resource ID).

For example, the UE 115 may transmit a first uplink reference signal to the base station 105 using a first beam (and resources) corresponding to an uplink resource ID 305-a, may transmit a second uplink reference signal to the base station 105 using a second beam (and resources) corresponding to an uplink resource ID 305-b, and so on. The base station 105 may receive the uplink reference signals (e.g., either directly or from an uplink node via a backhaul link) and may determine one or more preferred beams for the UE 115 to transmit random access messages. For example, the base station 105 may determine the preferred beam(s), as described with reference to FIG. 2, and may transmit control signaling configuring the UE 115 with the one or more preferred beams, by indicating one or more uplink resource IDs 305 for one or more RACH occasions. For example, the control signaling may indicate the one or more uplink resource IDs 305, where each uplink resource ID 305 may be associated with a respective beam. Thus, the indication of an uplink resource ID 305 may indicate the associated beam to the UE 115 (e.g., for use in a random access procedure).

For example, as illustrated by FIG. 3A, the base station 105 may indicate an uplink resource ID 305-d, which may be associated with a respective uplink beam that is to be used for one or more RACH occasions 310. For example, the base station 105 may indicate that the beam associated with uplink resource ID 305-d is applicable to a set of RACH occasions 310 that may include some (e.g., a subset) or all RACH occasions configured for the UE 115. For example, the base station 105 may transmit (or broadcast) an indication of a set of random access occasions, over which the UE 115 may transmit random access messages. In some examples, the base station 105 may configure one or more uplink resource IDs 305 (e.g., and corresponding beams) for all random access occasions, random access resources, random access preambles, or any combination thereof. For example, the uplink resource ID 305-d may indicated such that the UE 115 may use the beam associated with uplink resource ID 305-d for any random access process and to transmit random access messages using any RACH occasion.

In some examples, the base station 105 may configure different uplink resource IDs 305 (e.g., and corresponding beams) for different random access occasions, random access resources, random access preambles, or any combination thereof. For example, the base station 105 may indicate that a beam corresponding to an uplink resource ID 305 be used for one or more random access occasions (e.g., a RACH occasion 315 or 320), one or more random access resources, one or more random access preambles, or any combination thereof. As illustrated by FIG. 3B, the base station 105 may indicate different, respective beams for different RACH occasions. For example, the base station 105 may indicate that a RACH occasion 315 is associated with an SRS resource ID 305-j (e.g., and a corresponding uplink beam) and that a RACH occasion 320 is associated with an SRS resource ID 305-1 (e.g., and a corresponding uplink beam). The base station 105 may indicate the different uplink resource IDs 305 to the UE 115 and the UE 115 may use the respective beam associated with a RACH occasion that the UE 115 selects for transmission of a random access message. For example, if the UE 115 selects RACH occasion 315, the UE 115 may use an uplink beam associated with uplink resource ID 305-j and if the UE 115 selects RACH occasion 320, the UE 115 may use an uplink beam associated with uplink resource ID 305-1.

Similarly, the indicated uplink beam(s) may be separately configured for four step random access procedures (e.g., Type 1 procedures) and two step random access procedures (e.g., Type 2 procedures). For example, the base station 105 may indicate a first uplink resource ID 305 (e.g., uplink resource ID 305-j) and corresponding beam associated with four step random access procedures and may indicate a second uplink resource ID 305 (e.g., uplink resource ID 305-1) and corresponding beam associated with two step random access procedures. For two step random access procedures, the indicated uplink beam (e.g., transmit beam) may be used for a MSGA preamble and payload. For four step random access procedures, the indicated uplink beam (e.g., transmit beam) may be used for a MSG1, as well as a physical uplink shared channel (PUSCH) transmission (e.g., step 3) scheduled by a random access response grant.

In some examples, the base station 105 may indicate different uplink resource IDs 305, and corresponding beams, for different random access triggering events (e.g., BFR, a PDCCH order). For example, the base station 105 may indicate that a beam associated with uplink resource ID 305-1 be used for a random access process triggered for BFR (e.g., on a primary cell (PCell) or a primary secondary cell (PSCell)), or that a beam associated with uplink resource ID 305-j be used for a random access process triggered by a PDCCH order DCI message, or both. Other beams may be indicated by the base station 105 for other random access triggers without departing from the scope of the present disclosure. In some cases, a beam indicated by the base station 105 may not be used when performing a random access procedure for initial access (e.g., because such a beam may not yet be indicated by the base station 105).

When a PDCCH order triggers random access, the base station 105 may transmit the control signaling indicating the one or more preferred beams as a DCI message, where the configuration of the DCI message may indicate the uplink resource ID 305 (e.g., uplink resource ID 305-j). For example, the DCI message may be a DCI format 1_0 message with a CRC scrambled by a C-RNTI, and with an FDRA field having one or more values each set to "1." In such cases, the DCI may include a number (e.g., a relatively higher number) of reserved or unused bits. When one or more other triggers initiate a random access procedure (e.g., a BFR triggers random access) the preferred beam(s) may be indicated by the base station 105 via RRC signaling or via a MAC-CE.

In some cases, the base station 105 may indicate different beams, associated with respective uplink resource IDs 305, for different types of random access. For example, the base station 105 may indicate a first set of one or more uplink beams for CBRA procedures and a second set of one or more uplink beams for CFRA procedures. The base station 105 may indicate the first set of uplink beams via a corresponding first set of one or more uplink resource IDs 305 for CBRA and the second set of uplink beams via a corresponding second set of one or more uplink resource IDs 305 for CFRA. In some other cases, indicating one or more uplink beams for random access transmissions may be applicable to RACH resources (e.g., dedicated resources) configured for CFRA random access procedures and may not be applicable to resources configured for CBRA procedures.

The UE 115 may receive the control signaling (whether through RRC signaling, a MAC-CE, or a DCI message) from the base station 105 indicating the one or more preferred beams according to one or more of the examples described herein. The UE 115 may select a beam for random access corresponding to an uplink resource ID 305 based thereon.

Figure 4:
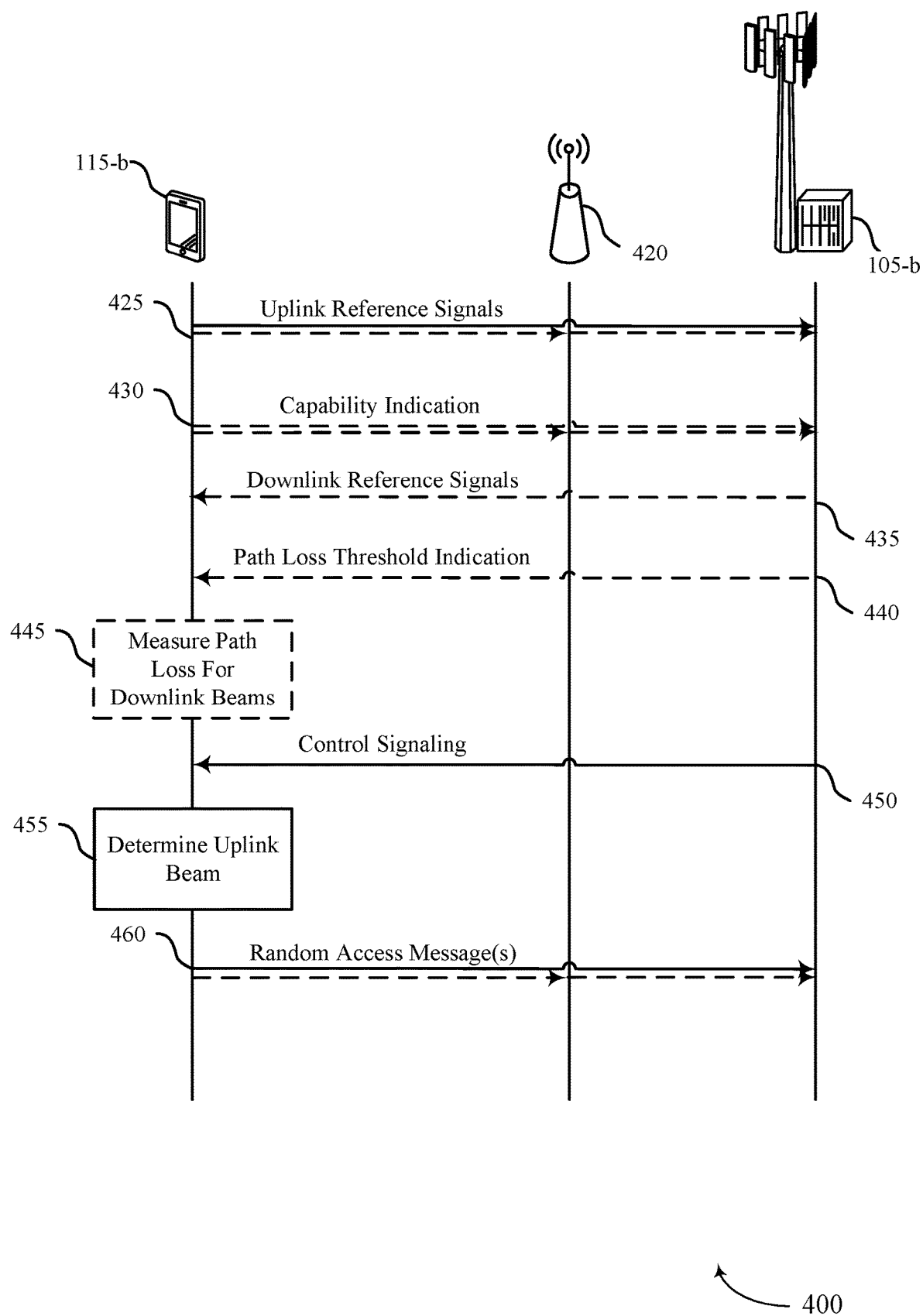
FIG. 4 illustrates an example of a process flow that supports an indication of a random access transmission beam in accordance with aspects of the present disclosure.

FIG. 4 illustrates an example of a process flow 400 that supports an indication of a random access transmission beam in accordance with aspects of the present disclosure. The process flow 400 may illustrate an example of techniques used by a communication system for random access procedures which may, for example, be implemented by a UE 115-b, a base station 105-b, and in some cases, an uplink node 420. For example, process flow 400 may support transmission of control signaling from base station 105-b to UE 115-b, indicating one or more uplink resource IDs (e.g., corresponding to respective uplink beams) for UE 115-b to use in subsequent random access procedures (e.g., as described herein with reference to FIGS. 2 and 3). Base station 105-b, UE 115-b, and uplink node 420 may be examples of the corresponding devices described with reference to FIGS. 1-3.

Alternative examples of the following may be implemented, where some steps may be performed in a different order than described or may not be performed at all. In some cases, steps may include additional features not mentioned below, or further steps may be added. In some cases, some aspects of some operations may also be performed by one or more other wireless devices. For example, some operations described as being performed by the uplink node 420 may be performed by the base station 105-b, or by another base station 105 (e.g., when UE 115-b is configured with an SUL carrier).

At 425, the UE 115-b may transmit a set of uplink reference signals (e.g., SRSs, such as beam management SRSs) associated with a set of uplink beams, to the base station 105-b. Each uplink reference signal of the set of uplink reference signals may be associated with a respective beam of the set of uplink beams. In some examples, the UE 115-b may transmit at least a portion of the set of uplink reference signals to the base station 105-b directly (e.g., when the UE 115-b is configured with an SUL carrier for communications with the base station 105-b). Additionally or alternatively, the UE 115-b may transmit at least a portion (if not all) of the set of uplink reference signals to the uplink node 420, where the uplink node 420 may transmit (or forward) the at least a portion of the set of uplink reference signals to the base station 105-b.

In some examples, the UE 115-b may transmit the set of uplink reference signals via an SUL carrier in communication (either directly or vicariously through uplink node 420) with the base station 105-b. Transmission of uplink reference signals is described in more detail herein with reference to FIG. 2. The base station 105-b may receive the set of uplink reference signals (e.g., an indication of a signal quality, such as received directly or via the uplink node 420). For example, the base station may receive an indication of a signal quality of the set of uplink reference signals associated with the set of uplink beams. Receiving the indication of the signal quality is described in more detail with reference to FIG. 2.

In some examples, at 430, the UE 115-b may transmit, to the base station 105-b, an indication of a UE capability for using an uplink beam that is unassociated with downlink beams used for communications between the base station 105-b and the UE 115-b. Transmitting the UE capability and the related processes are described in more detail with reference to FIG. 2.

In some examples, at 435, the base station 105-b may transmit a set of downlink reference signals, via a set of corresponding downlink beams, to the UE 115-b. That is, the base station 105-b may transmit one or more SSBs, CSI-RSs, or the like, to the UE 115-b based on the UE 115-b being in an RRC connected mode with the base station 105-b. The UE 115-b may receive the set of downlink reference signals and, in some cases, may perform measurements on the set of downlink beams.

In some examples, at 440, the base station 105-b may transmit an indication of a path loss threshold for the set of downlink beams, to the UE 115-b, for example, as described with reference to FIG. 2. In other examples, the path loss threshold may be pre-defined at the UE 115-b (e.g., as described with reference to FIG. 2).

In some examples, at 445, the UE 115-b may measure a path loss for one or more of the set of downlink beams based on receiving the set of downlink signals at 435. Measuring pathloss for the downlink beams is described in more detail with reference to FIG. 2.

At 450, the base station may transmit, to the UE 115-b and at least in response to receiving the indication of the signal quality at 425, control signaling indicating one or more uplink beams from the set of uplink beams for the UE 115-b to use in a random access procedure. The control signaling may include an indication of one or more uplink reference signals (e.g., reference signal resource IDs) of the set of uplink reference signals received at 425, each of the uplink reference signals associated with a corresponding uplink beam. In some examples, the control signaling may include an indication of a set of random access occasions associated with the one or more uplink beams (e.g., as described with reference to FIGS. 3A and 3B).

In some examples, the base station 105-b may determine the one or more uplink beams, and the indication of the one or more uplink beams may be based on determining the one or more beams. The base station 105-b may, for example, select one or more uplink beams based on one or more corresponding SRS measurements (e.g., based on the set of uplink signals received from the UE 115-b). For example, the base station 105-b may select one or more beams associated with a highest signal quality (e.g., an SNR, reference signal received power (RSRP)), as indicated by the received SRS.

In some examples, the control signaling may include an indication of a first set of uplink beams for the UE 115-b to use in a CBRA procedure and an indication of a second set of uplink beams for the UE 115-b to use in an CFRA procedure. In some examples, the control signaling may include an indication of a first set of uplink beams for the UE 115-b to use in a two-step random access procedure and an indication of a second set of uplink beams for the UE 115-b to use in a four-step random access procedure. In some examples, the control signaling may include an indication of a first set of uplink beams for the UE 115-b to use in a first type of random access procedure associated with a first triggering condition (e.g., BFD) and an indication of a second set of uplink beams for the UE 115-b to use in a second type of random access procedure associated with a second triggering condition (e.g., a PDCCH order DCI message). In some examples, the UE 115-b may be configured with a first uplink carrier associated with a downlink carrier, where the control signaling may include an indication of a second uplink carrier (e.g., an SUL carrier) associated with the downlink carrier. Transmitting control signaling is described in more detail with reference to FIGS. 2, 3A, and 3B.

The UE 115-b may receive the control signaling at 450, based on the base station 105-b transmitting the control signaling. In some cases, transmitting the control signaling may be based on the UE 115-b being configured in a deployment configuration where uplink beams of the UE 115-b are decoupled from downlink beams of the UE 115-b (e.g., an uplink dense deployment system, a system utilizing SUL carriers). Additionally or alternatively, the base station 105-b may transmit the control signaling based on the indication of the UE capability at 430.

At 455, the UE 115-b may determine an uplink beam for performing subsequent random access procedures based on the control signaling received at 450. In some examples, the UE 115-b may determine the uplink beam based on comparing the path loss measured at 445 to the path loss threshold. For example, the UE 115-b may determine whether to use a first uplink beam of the set of uplink beams indicated in the control signaling received at 450 or to use a second uplink beam corresponding to one or more of the set of downlink beams (e.g., used by the base station 105-b to transmit the downlink reference signals at 435). In such examples, determining whether to use the first uplink beam or the second uplink beam may be based on receiving the indication of the path loss threshold at 440 or the path loss threshold being pre-defined at the UE 115-b, among other examples.

In an example, the UE 115-b may select the uplink beam based on the control signaling at 450 instead of based on the set of downlink beams used by the base station 105-b to transmit the downlink reference signals at 435. In other examples, the UE 115-b may determine to use one of the one or more uplink beams as the uplink beam for subsequent random access procedures (e.g., transmitting random access messages) based on determining to perform random access procedures using an SUL carrier. Determining the uplink beam for subsequent random access procedures is described in more detail with reference to FIG. 2.

At 460, the UE 115-b may transmit one or more random access messages to the base station 105-b based on determining the uplink beam at 455 (e.g., using the uplink beam). The number of random access messages may depend on the type of random access process (e.g., two-step RACH, four-step RACH, or the like) associated with the random access message(s). In some examples, the UE 115-b may transmit the one or more random access messages using an accumulated TA associated with the one or more uplink beams. The UE 115-b may use the accumulated TA based on determining the uplink beam at 455 to be an uplink beam as indicated in the control signaling at 450. Transmitting random access messages is described in more detail with reference to FIGS. 2, 3A and 3B.

The techniques described herein may support use uplink beams for performing random access procedures that may be associated with a greater signal quality, which may reduce system latency, reduce a usage of transmission resources, and enhance system efficiency.

Figure 5:
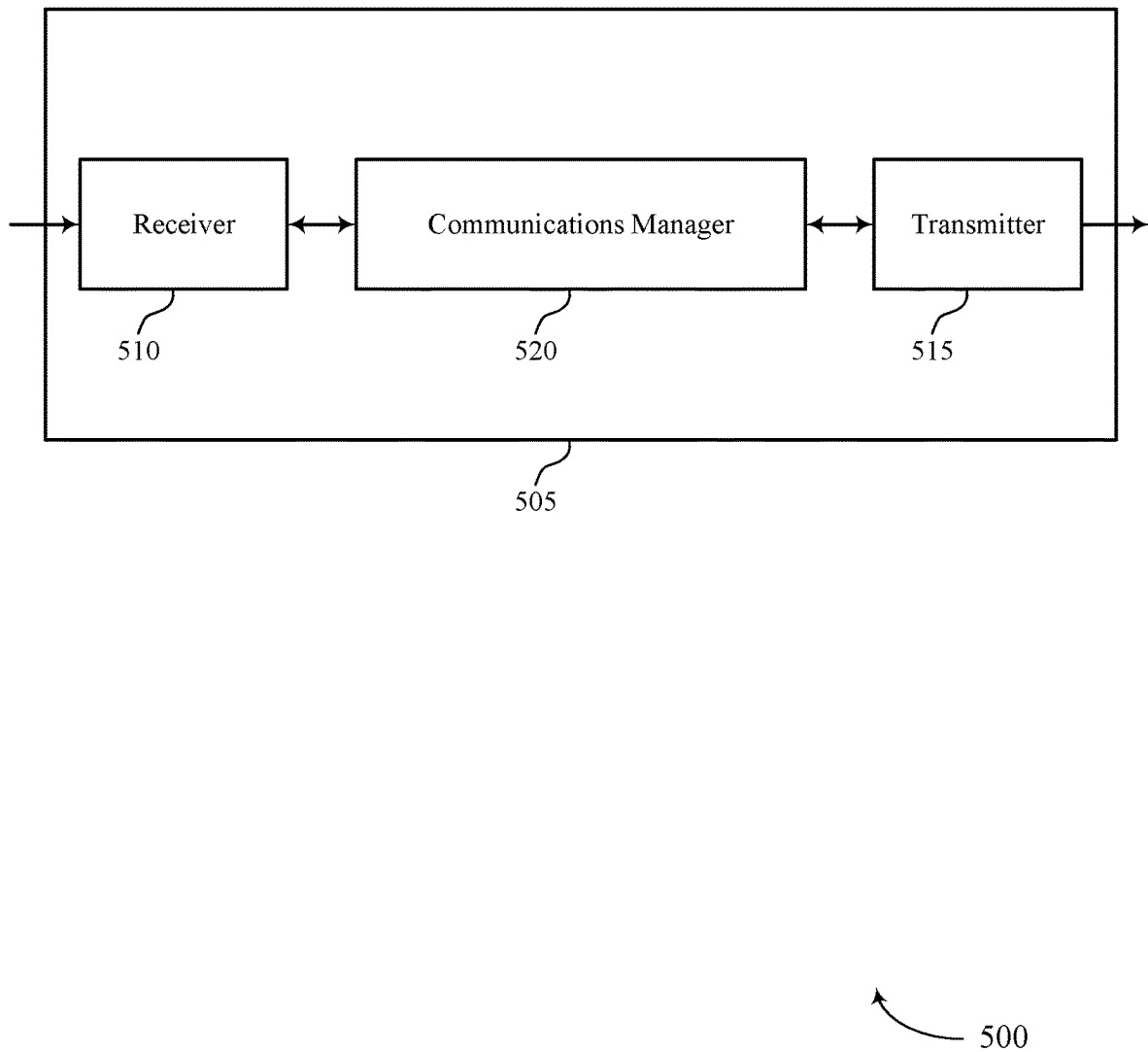
FIGS. 5 and 6 show block diagrams of devices that support indications of random access transmission beams in accordance with aspects of the present disclosure.

FIG. 5 shows a block diagram 500 of a device 505 that supports indication of a random access transmission beam in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to indication of a random access transmission beam). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to indication of a random access transmission beam). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of indication of a random access transmission beam as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for transmitting a set of multiple uplink reference signals associated with a set of uplink beams, where each uplink reference signal of the set of multiple uplink reference signals is associated with a respective uplink beam of the set of uplink beams. The communications manager 520 may be configured as or otherwise support a means for receiving, from a base station and at least in part in response to transmitting the set of multiple uplink reference signals, control signaling indicating one or more uplink beams from the set of uplink beams for the UE to use in a random access procedure. The communications manager 520 may be configured as or otherwise support a means for transmitting a first random access message using an uplink beam selected based on the indication of the one or more uplink beams.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for enhanced random access procedures allowing for reduced power consumption and more efficient communications.

Figure 6:
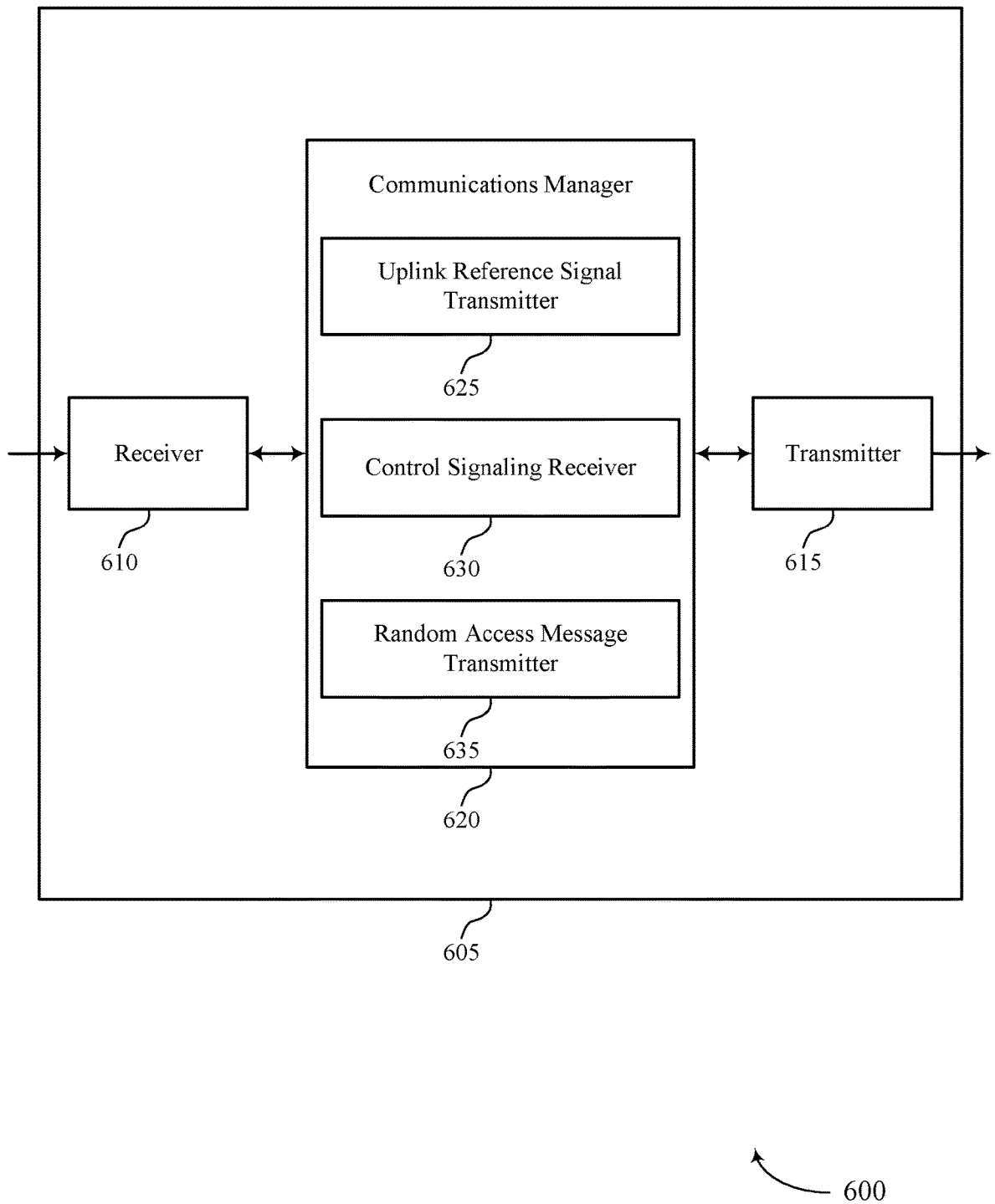

FIG. 6 shows a block diagram 600 of a device 605 that supports indication of a random access transmission beam in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to indication of a random access transmission beam). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to indication of a random access transmission beam). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of indication of a random access transmission beam as described herein. For example, the communications manager 620 may include an uplink reference signal transmitter 625, a control signaling receiver 630, a random access message transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The uplink reference signal transmitter 625 may be configured as or otherwise support a means for transmitting a set of multiple uplink reference signals associated with a set of uplink beams, where each uplink reference signal of the set of multiple uplink reference signals is associated with a respective uplink beam of the set of uplink beams. The control signaling receiver 630 may be configured as or otherwise support a means for receiving, from a base station and at least in part in response to transmitting the set of multiple uplink reference signals, control signaling indicating one or more uplink beams from the set of uplink beams for the UE to use in a random access procedure. The random access message transmitter 635 may be configured as or otherwise support a means for transmitting a first random access message using an uplink beam selected based on the indication of the one or more uplink beams.

Figure 7:
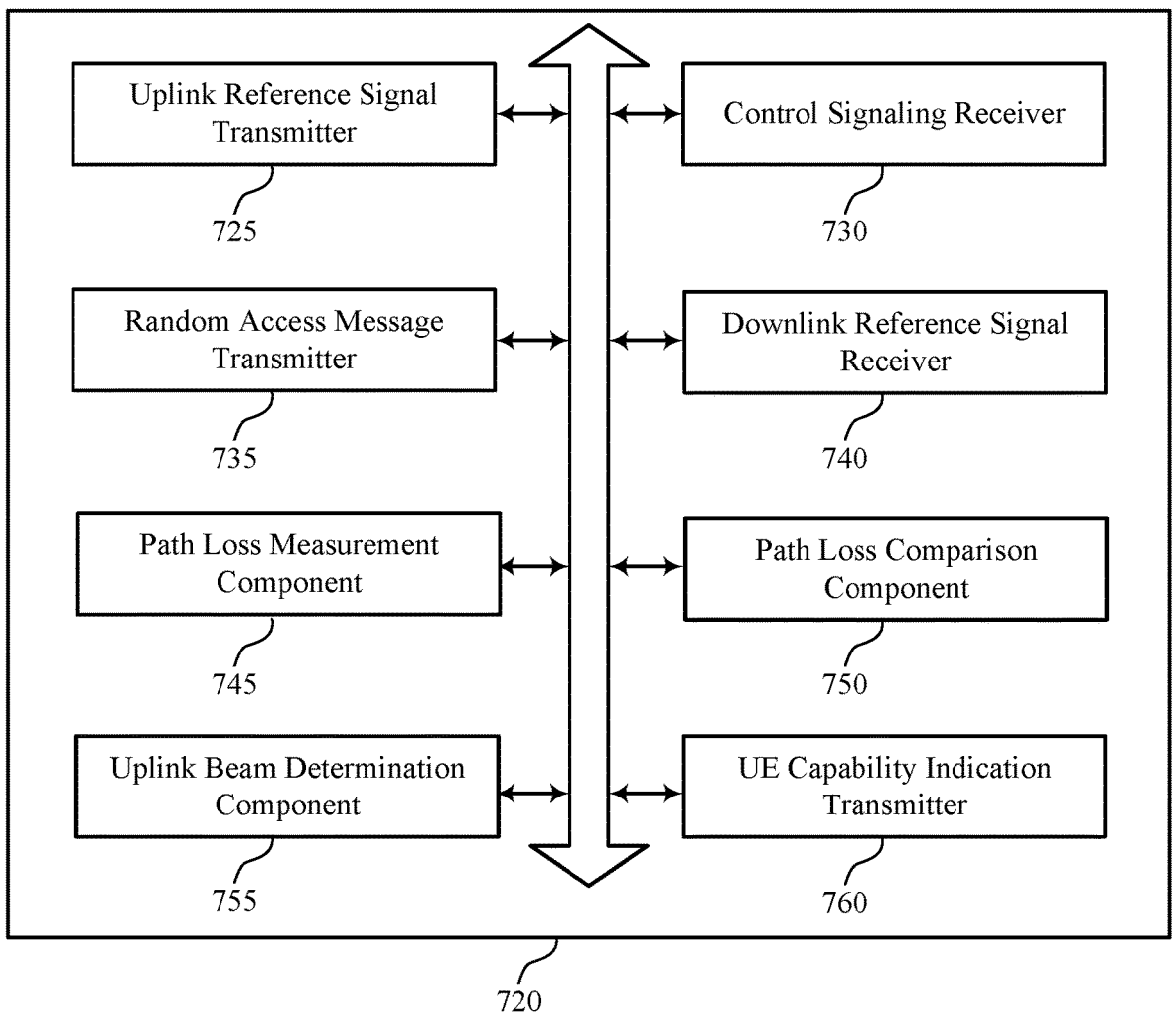
FIG. 7 shows a block diagram of a communications manager that supports an indication of a random access transmission beam in accordance with aspects of the present disclosure.

FIG. 7 shows a block diagram 700 of a communications manager 720 that supports indication of a random access transmission beam in accordance with aspects of the present disclosure. The communications manager 720 may be an example of aspects of a communications manager 520, a communications manager 620, or both, as described herein. The communications manager 720, or various components thereof, may be an example of means for performing various aspects of indication of a random access transmission beam as described herein. For example, the communications manager 720 may include an uplink reference signal transmitter 725, a control signaling receiver 730, a random access message transmitter 735, a downlink reference signal receiver 740, a path loss measurement component 745, a path loss comparison component 750, an uplink beam determination component 755, a UE capability indication transmitter 760, or any combination thereof. Each of these components may communicate, directly or indirectly, with one another (e.g., via one or more buses).

The communications manager 720 may support wireless communication at a UE in accordance with examples as disclosed herein. The uplink reference signal transmitter 725 may be configured as or otherwise support a means for transmitting a set of multiple uplink reference signals associated with a set of uplink beams, where each uplink reference signal of the set of multiple uplink reference signals is associated with a respective uplink beam of the set of uplink beams. The control signaling receiver 730 may be configured as or otherwise support a means for receiving, from a base station and at least in part in response to transmitting the set of multiple uplink reference signals, control signaling indicating one or more uplink beams from the set of uplink beams for the UE to use in a random access procedure. The random access message transmitter 735 may be configured as or otherwise support a means for transmitting a first random access message using an uplink beam selected based on the indication of the one or more uplink beams.

In some examples, to support receiving the control signaling indicating the one or more uplink beams, the control signaling receiver 730 may be configured as or otherwise support a means for receiving an indication of a set of random access occasions associated with the one or more uplink beams.

In some examples, receiving the control signaling indicating the one or more uplink beams is based on the UE being configured in a deployment configuration where uplink beams of the UE are decoupled from downlink beams of the UE.

In some examples, to support receiving the control signaling indicating the one or more uplink beams, the control signaling receiver 730 may be configured as or otherwise support a means for receiving an indication of a first set of uplink beams for the UE to use in a contention-based random access procedure. In some examples, to support receiving the control signaling indicating the one or more uplink beams, the control signaling receiver 730 may be configured as or otherwise support a means for receiving an indication of a second set of uplink beams for the UE to use in a contention-free random access procedure.

In some examples, to support receiving the control signaling indicating the one or more uplink beams, the control signaling receiver 730 may be configured as or otherwise support a means for receiving an indication of a first set of uplink beams for the UE to use in a two-step random access procedure. In some examples, to support receiving the control signaling indicating the one or more uplink beams, the control signaling receiver 730 may be configured as or otherwise support a means for receiving an indication of a second set of uplink beams for the UE to use in a four-step random access procedure.

In some examples, to support receiving the control signaling indicating the one or more uplink beams, the control signaling receiver 730 may be configured as or otherwise support a means for receiving an indication of a first set of uplink beams for the UE to use in a first type of random access procedure associated with a first triggering condition. In some examples, to support receiving the control signaling indicating the one or more uplink beams, the control signaling receiver 730 may be configured as or otherwise support a means for receiving an indication of a second set of uplink beams for the UE to use in a second type of random access procedure associated with a second triggering condition.

In some examples, the downlink reference signal receiver 740 may be configured as or otherwise support a means for receiving a set of downlink reference signals via a set of downlink beams. In some examples, the path loss measurement component 745 may be configured as or otherwise support a means for measuring a path loss for one or more of the set of downlink beams based on receiving the set of downlink reference signals. In some examples, the path loss comparison component 750 may be configured as or otherwise support a means for determining, based on a comparison of the path loss to a path loss threshold, whether to use a first uplink beam of the one or more uplink beams or a second uplink beam corresponding to one of the set of downlink beams as the uplink beam for the first random access message.

In some examples, the control signaling receiver 730 may be configured as or otherwise support a means for receiving an indication of the path loss threshold from the base station, where determining whether to use the first uplink beam or the second uplink beam is based on receiving the indication of the path loss threshold.

In some examples, the UE is configured with a first uplink carrier associated with a downlink carrier, and the control signaling receiver 730 may be configured as or otherwise support a means for receiving control signaling indicating a second uplink carrier associated with the downlink carrier, the second uplink carrier configured for SUL. In some examples, the UE is configured with a first uplink carrier associated with a downlink carrier, and the uplink beam determination component 755 may be configured as or otherwise support a means for determining to use one of the one or more uplink beams as the uplink beam for the first random access message based on determining to transmit the first random access message via the second uplink carrier.

In some examples, the one or more uplink beams include the uplink beam, and the random access message transmitter 735 may be configured as or otherwise support a means for transmitting the first random access message using an accumulated timing advance associated with the one or more uplink beams.

In some examples, the downlink reference signal receiver 740 may be configured as or otherwise support a means for receiving a set of downlink reference signals via a set of downlink beams. In some examples, the uplink beam determination component 755 may be configured as or otherwise support a means for selecting the uplink beam based on the indication of the one or more uplink beams instead of based on the set of downlink beams.

In some examples, to support receiving the control signaling indicating the one or more uplink beams, the control signaling receiver 730 may be configured as or otherwise support a means for receiving an indication of one or more uplink reference signals of the set of multiple uplink reference signals, each of the one or more uplink reference signals associated with a corresponding uplink beam of the one or more uplink beams.

In some examples, the UE capability indication transmitter 760 may be configured as or otherwise support a means for transmitting an indication of a UE capability for using an uplink beam that is unassociated with downlink beams used for communications between the base station and the UE, where receiving the indication of the one or more uplink beams is based at least in part the indication of the UE capability.

In some examples, to support transmitting the set of multiple uplink reference signals, the control signaling receiver 730 may be configured as or otherwise support a means for transmitting the set of multiple uplink reference signals via a SUL carrier or an uplink node in communication with the base station.

Figure 8:
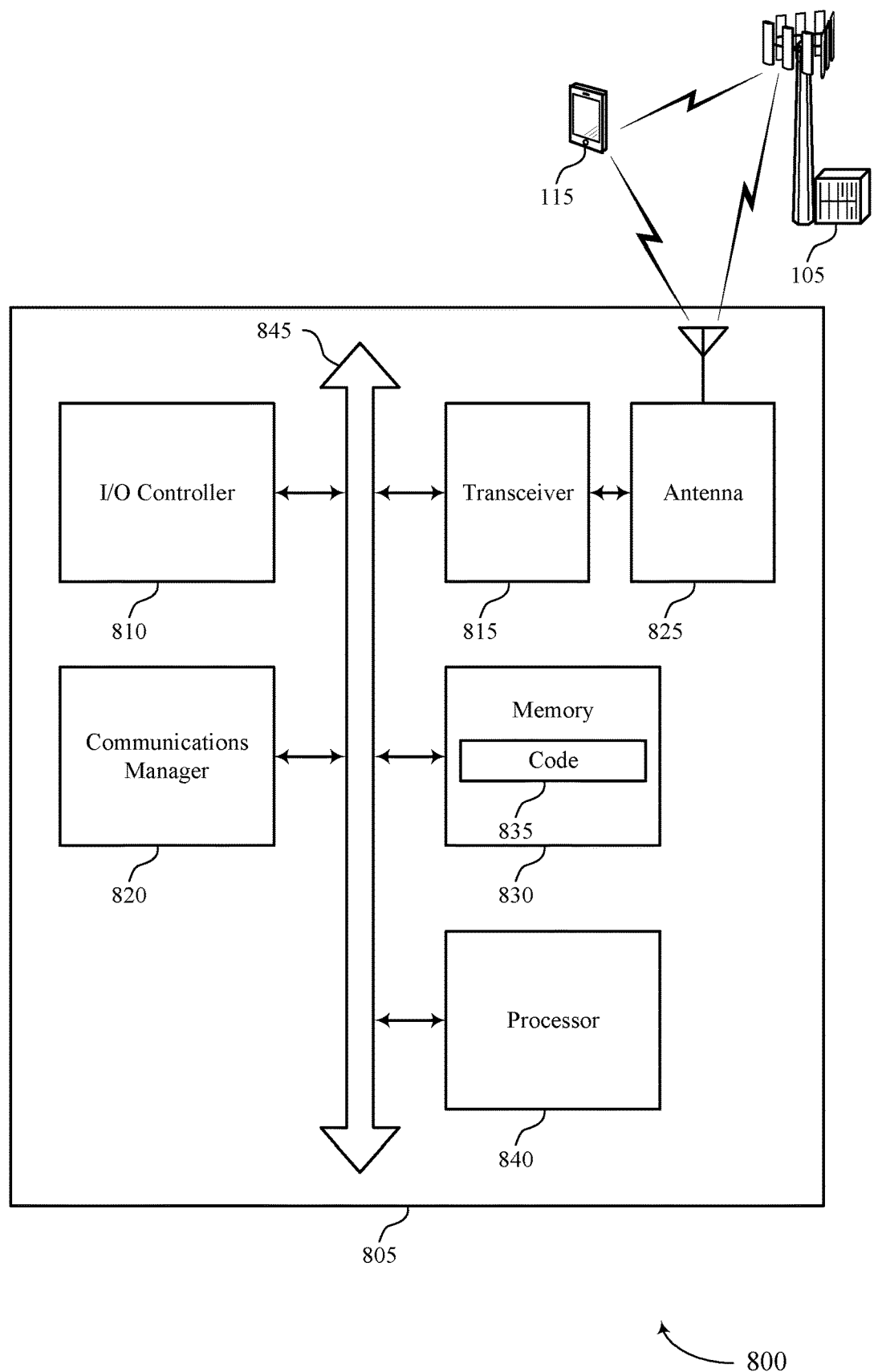
FIG. 8 shows a diagram of a system including a device that supports an indication of a random access transmission beam in accordance with aspects of the present disclosure.

FIG. 8 shows a diagram of a system 800 including a device 805 that supports indication of a random access transmission beam in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting indication of a random access transmission beam). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting a set of multiple uplink reference signals associated with a set of uplink beams, where each uplink reference signal of the set of multiple uplink reference signals is associated with a respective uplink beam of the set of uplink beams. The communications manager 820 may be configured as or otherwise support a means for receiving, from a base station and at least in part in response to transmitting the set of multiple uplink reference signals, control signaling indicating one or more uplink beams from the set of uplink beams for the UE to use in a random access procedure. The communications manager 820 may be configured as or otherwise support a means for transmitting a first random access message using an uplink beam selected based on the indication of the one or more uplink beams.

By including or configuring the communications manager 820 in accordance with examples as described herein, the device 805 may support techniques for enhanced random access procedures resulting in improved communication reliability, reduced latency, reduced power consumption, more efficient utilization of communication resources, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of indication of a random access transmission beam as described herein, or the processor 840 and the memory 830 may be otherwise configured to perform or support such operations.

Figure 9:
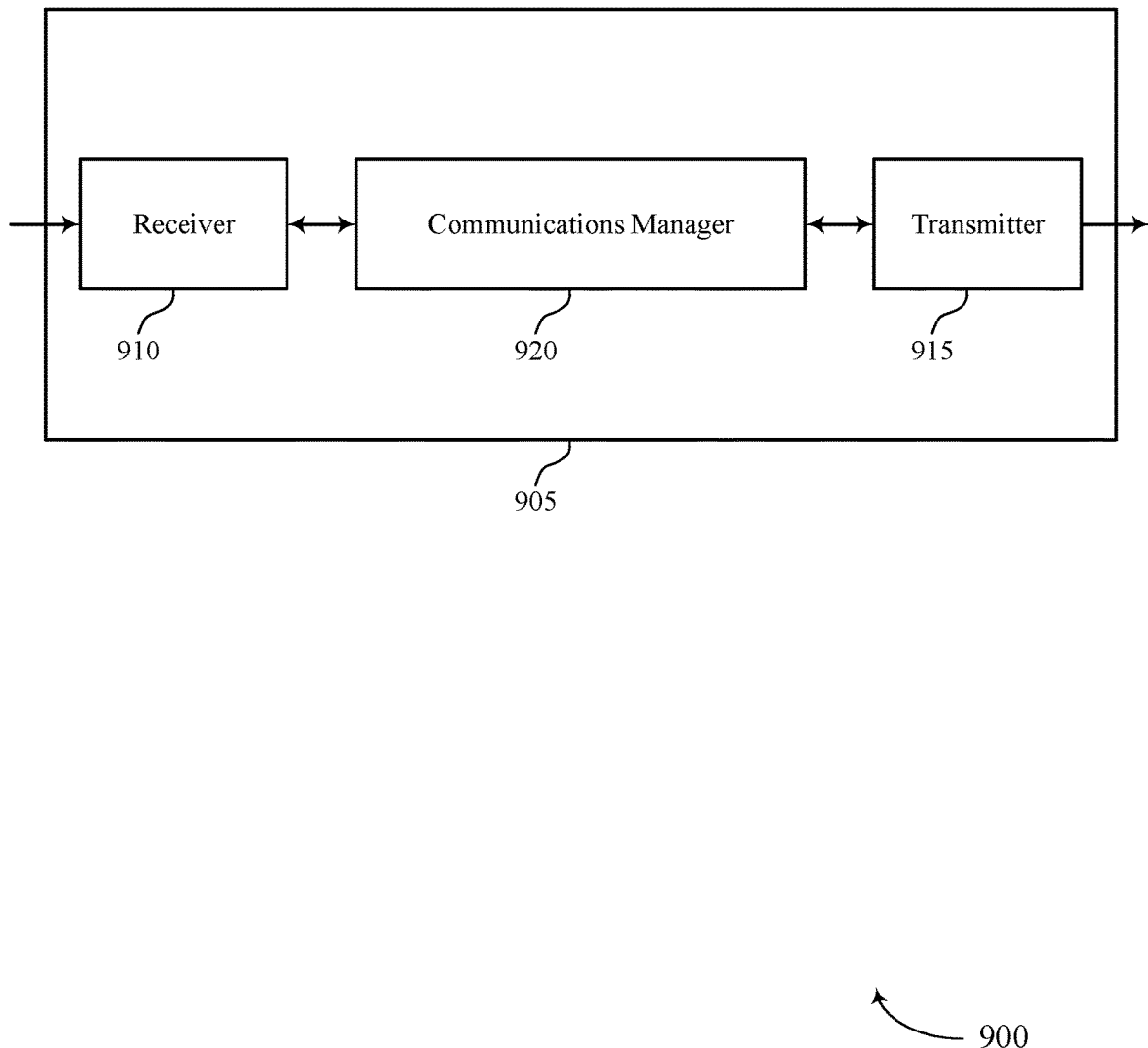
FIGS. 9 and 10 show block diagrams of devices that support indications of random access transmission beams in accordance with aspects of the present disclosure.

FIG. 9 shows a block diagram 900 of a device 905 that supports indication of a random access transmission beam in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to indication of a random access transmission beam). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to indication of a random access transmission beam). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of indication of a random access transmission beam as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving an indication of a signal quality of a set of multiple uplink reference signals associated with a set of uplink beams, where each uplink reference signal of the set of multiple uplink reference signals is associated with a respective uplink beam of the set of uplink beams. The communications manager 920 may be configured as or otherwise support a means for transmitting, to a UE and at least in part in response to receiving the indication of the signal quality, control signaling indicating one or more uplink beams from the set of uplink beams for the UE to use in a random access procedure. The communications manager 920 may be configured as or otherwise support a means for receiving an indication of a first random access message that is transmitted using an uplink beam selected based on the indication of the one or more uplink beams.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for transmitting control signaling indicating uplink beams for a UE to use for random access procedures, allowing for greater communications efficiency and mitigating waste of transmission resources.

Figure 10:
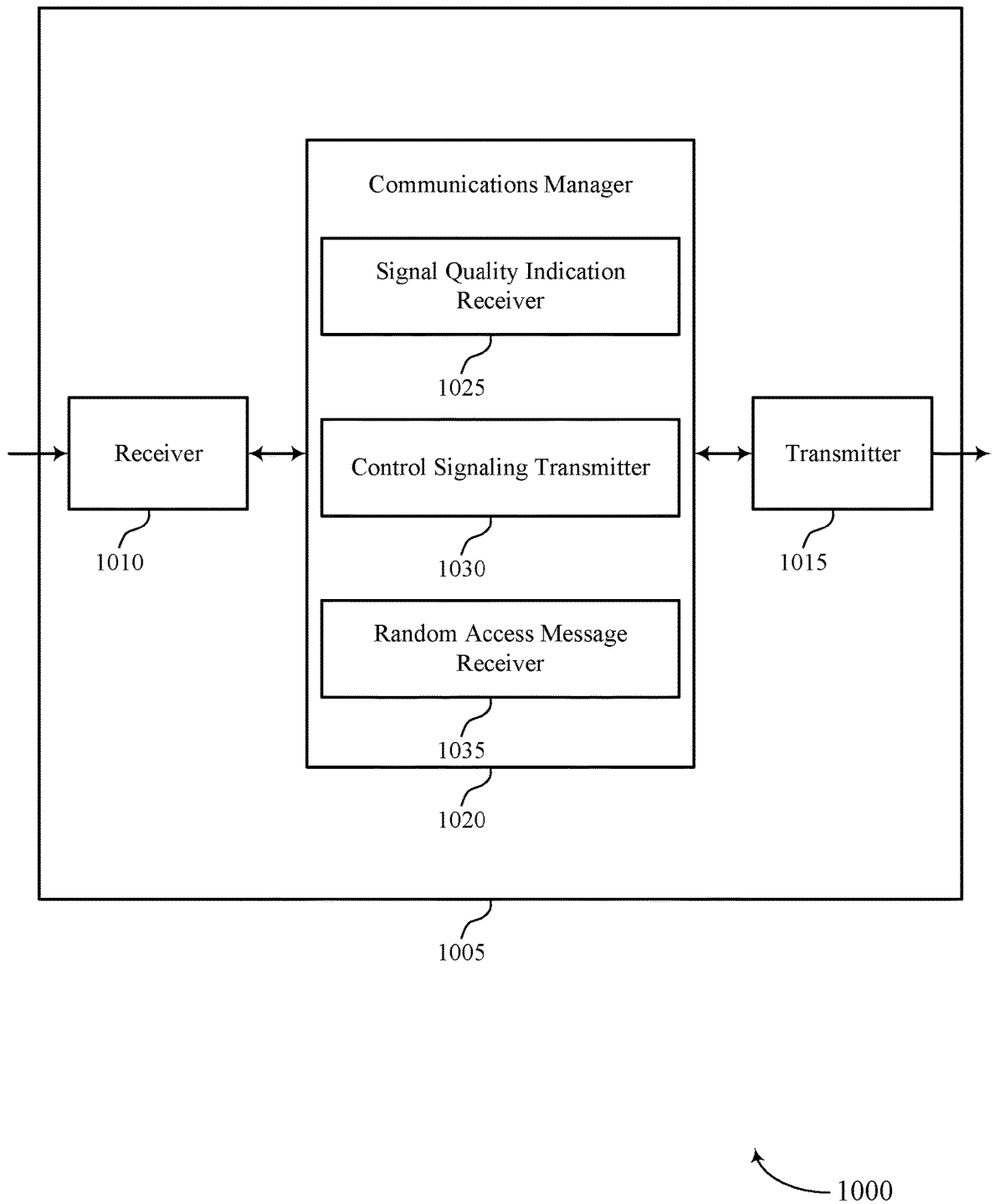

FIG. 10 shows a block diagram 1000 of a device 1005 that supports indication of a random access transmission beam in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to indication of a random access transmission beam). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to indication of a random access transmission beam). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of indication of a random access transmission beam as described herein. For example, the communications manager 1020 may include a signal quality indication receiver 1025, a control signaling transmitter 1030, a random access message receiver 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The signal quality indication receiver 1025 may be configured as or otherwise support a means for receiving an indication of a signal quality of a set of multiple uplink reference signals associated with a set of uplink beams, where each uplink reference signal of the set of multiple uplink reference signals is associated with a respective uplink beam of the set of uplink beams. The control signaling transmitter 1030 may be configured as or otherwise support a means for transmitting, to a UE and at least in part in response to receiving the indication of the signal quality, control signaling indicating one or more uplink beams from the set of uplink beams for the UE to use in a random access procedure. The random access message receiver 1035 may be configured as or otherwise support a means for receiving an indication of a first random access message that is transmitted using an uplink beam selected based on the indication of the one or more uplink beams.

Figure 11:
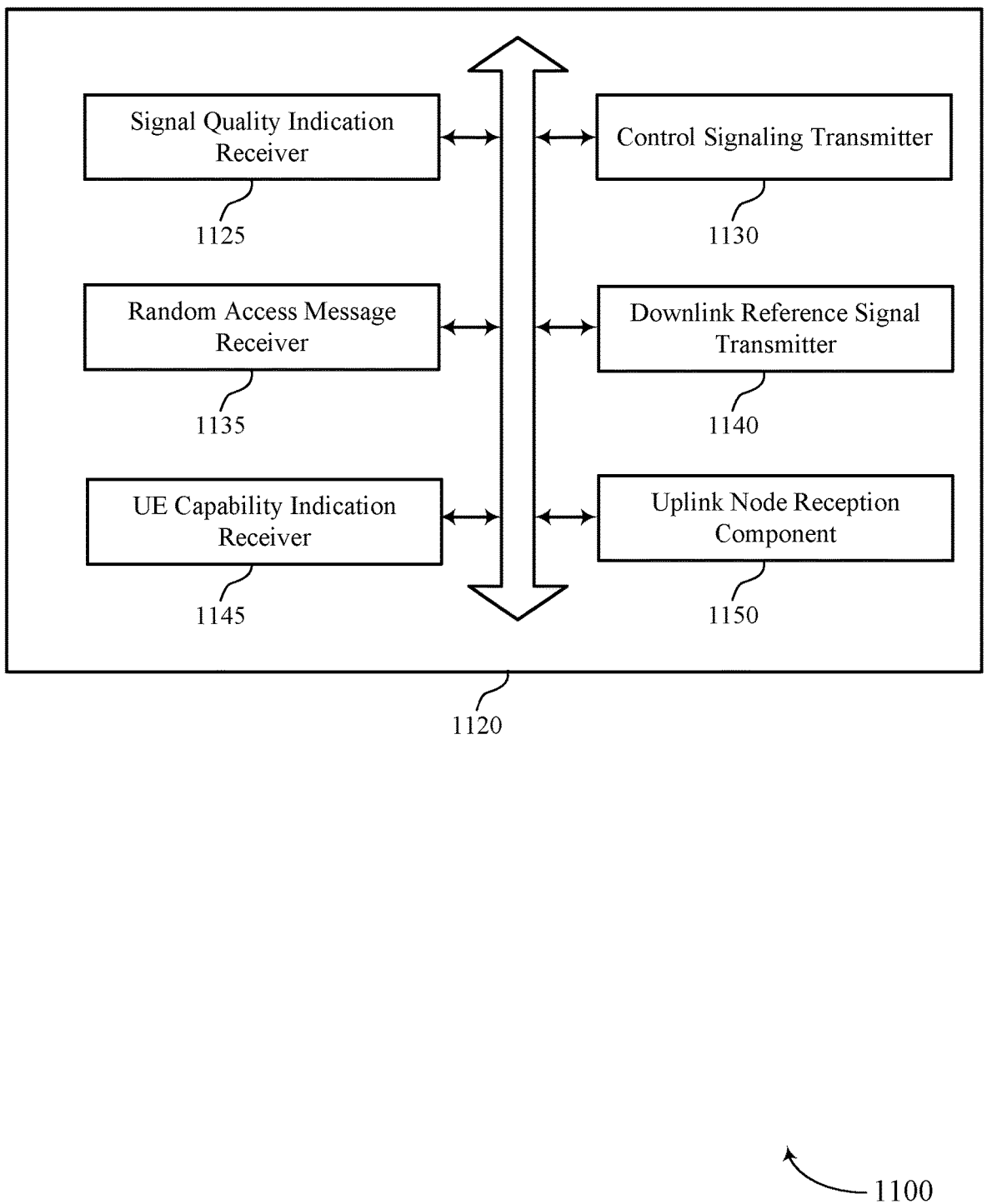
FIG. 11 shows a block diagram of a communications manager that supports an indication of a random access transmission beam in accordance with aspects of the present disclosure.

FIG. 11 shows a block diagram 1100 of a communications manager 1120 that supports indication of a random access transmission beam in accordance with aspects of the present disclosure. The communications manager 1120 may be an example of aspects of a communications manager 920, a communications manager 1020, or both, as described herein. The communications manager 1120, or various components thereof, may be an example of means for performing various aspects of indication of a random access transmission beam as described herein. For example, the communications manager 1120 may include a signal quality indication receiver 1125, a control signaling transmitter 1130, a random access message receiver 1135, a downlink reference signal transmitter 1140, a UE capability indication receiver 1145, an uplink node reception component 1150, or any combination thereof. Each of these components may communicate, directly or indirectly, with one another (e.g., via one or more buses).

The communications manager 1120 may support wireless communication at a base station in accordance with examples as disclosed herein. The signal quality indication receiver 1125 may be configured as or otherwise support a means for receiving an indication of a signal quality of a set of multiple uplink reference signals associated with a set of uplink beams, where each uplink reference signal of the set of multiple uplink reference signals is associated with a respective uplink beam of the set of uplink beams. The control signaling transmitter 1130 may be configured as or otherwise support a means for transmitting, to a UE and at least in part in response to receiving the indication of the signal quality, control signaling indicating one or more uplink beams from the set of uplink beams for the UE to use in a random access procedure. The random access message receiver 1135 may be configured as or otherwise support a means for receiving an indication of a first random access message that is transmitted using an uplink beam selected based on the indication of the one or more uplink beams.

In some examples, to support transmitting the control signaling indicating the one or more uplink beams, the control signaling transmitter 1130 may be configured as or otherwise support a means for transmitting an indication of a set of random access occasions associated with the one or more uplink beams.

In some examples, transmitting the control signaling indicating the one or more uplink beams is based on the UE being configured in a deployment configuration where uplink beams of the UE are decoupled from downlink beams of the UE.

In some examples, to support transmitting the control signaling indicating the one or more uplink beams, the control signaling transmitter 1130 may be configured as or otherwise support a means for transmitting an indication of a first set of uplink beams for the UE to use in a contention-based random access procedure. In some examples, to support transmitting the control signaling indicating the one or more uplink beams, the control signaling transmitter 1130 may be configured as or otherwise support a means for transmitting an indication of a second set of uplink beams for the UE to use in a contention-free random access procedure.

In some examples, to support transmitting the control signaling indicating the one or more uplink beams, the control signaling transmitter 1130 may be configured as or otherwise support a means for transmitting an indication of a first set of uplink beams for the UE to use in a two-step random access procedure. In some examples, to support transmitting the control signaling indicating the one or more uplink beams, the control signaling transmitter 1130 may be configured as or otherwise support a means for transmitting an indication of a second set of uplink beams for the UE to use in a four-step random access procedure.

In some examples, to support transmitting the control signaling indicating the one or more uplink beams, the control signaling transmitter 1130 may be configured as or otherwise support a means for transmitting an indication of a first set of uplink beams for the UE to use in a first type of random access procedure associated with a first triggering condition. In some examples, to support transmitting the control signaling indicating the one or more uplink beams, the control signaling transmitter 1130 may be configured as or otherwise support a means for transmitting an indication of a second set of uplink beams for the UE to use in a second type of random access procedure associated with a second triggering condition.

In some examples, the downlink reference signal transmitter 1140 may be configured as or otherwise support a means for transmitting, to the UE, a set of downlink reference signals via a set of downlink beams. In some examples, the control signaling transmitter 1130 may be configured as or otherwise support a means for transmitting an indication of a path loss threshold for the set of downlink beams, where the uplink beam is based on the path loss threshold.

In some examples, the UE capability indication receiver 1145 may be configured as or otherwise support a means for receiving an indication of a UE capability for using an uplink beam that is unassociated with downlink beams used for communications between the base station and the UE, where transmitting the indication of the one or more uplink beams is based at least in part the indication of the UE capability.

In some examples, the uplink node reception component 1150 may be configured as or otherwise support a means for receiving the indication of the signal quality of the set of multiple uplink reference signals, the indication of the first random access message, or both, from an uplink node in communication with the base station.

Figure 12:
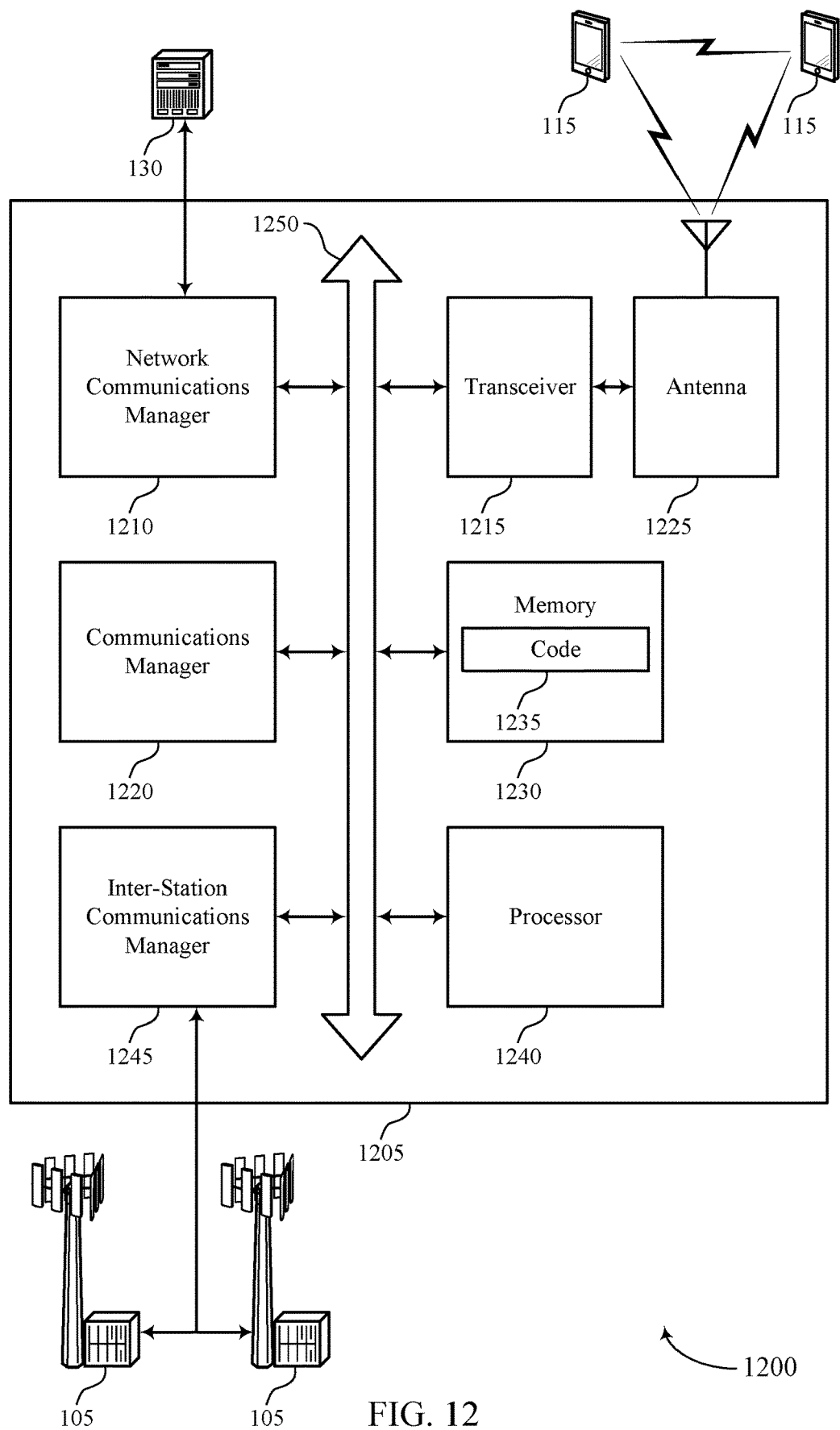
FIG. 12 shows a diagram of a system including a device that supports an indication of a random access transmission beam in accordance with aspects of the present disclosure.

FIG. 12 shows a diagram of a system 1200 including a device 1205 that supports indication of a random access transmission beam in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting indication of a random access transmission beam). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving an indication of a signal quality of a set of multiple uplink reference signals associated with a set of uplink beams, where each uplink reference signal of the set of multiple uplink reference signals is associated with a respective uplink beam of the set of uplink beams. The communications manager 1220 may be configured as or otherwise support a means for transmitting, to a UE and at least in part in response to receiving the indication of the signal quality, control signaling indicating one or more uplink beams from the set of uplink beams for the UE to use in a random access procedure. The communications manager 1220 may be configured as or otherwise support a means for receiving an indication of a first random access message that is transmitted using an uplink beam selected based on the indication of the one or more uplink beams.

By including or configuring the communications manager 1220 in accordance with examples as described herein, the device 1205 may support techniques for improved communication reliability, reduced latency, reduced power consumption, more efficient utilization of communication resources, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of indication of a random access transmission beam as described herein, or the processor 1240 and the memory 1230 may be otherwise configured to perform or support such operations.

Figure 13:
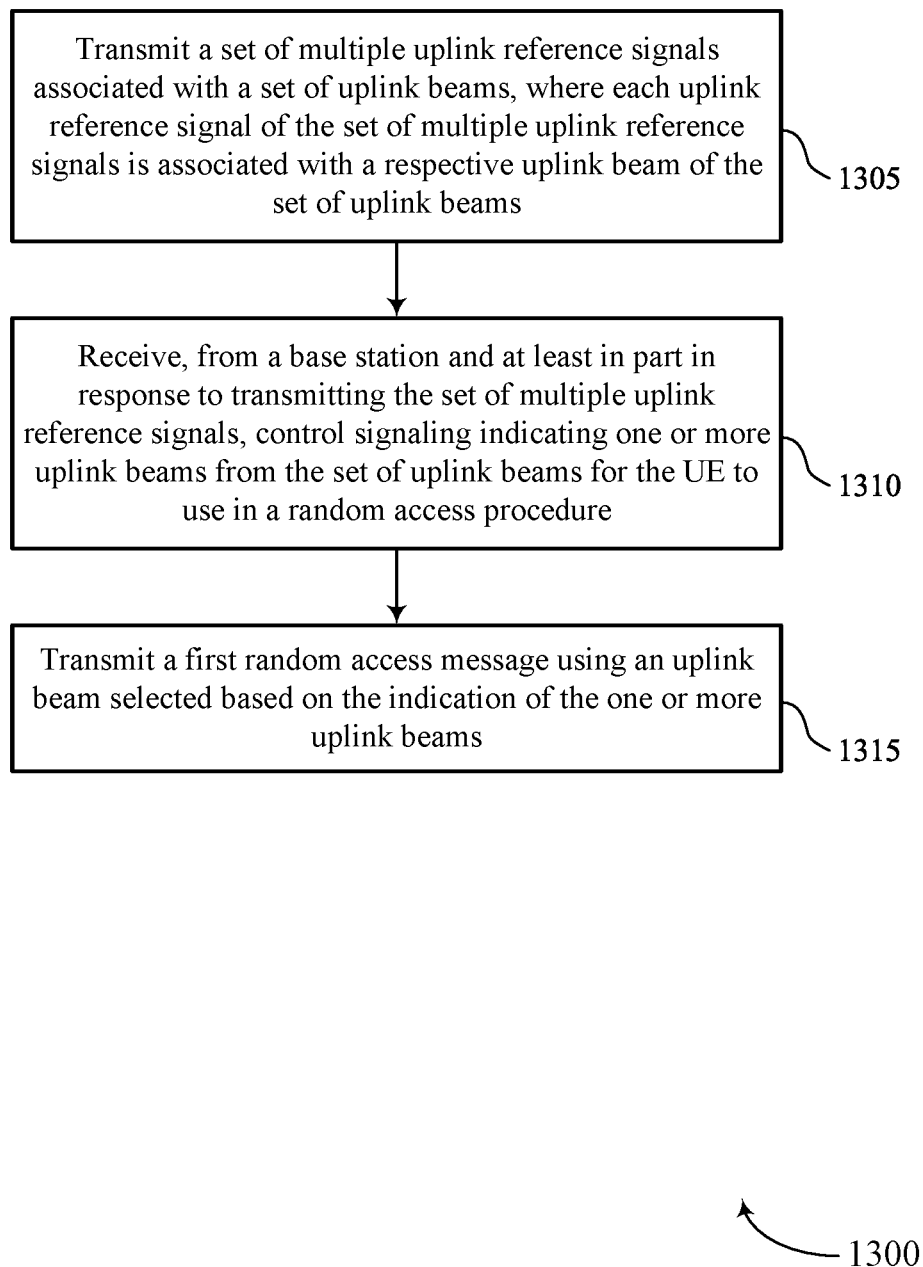
FIGS. 13 through 16 show flowcharts illustrating methods that support indications of random access transmission beams in accordance with aspects of the present disclosure.

FIG. 13 shows a flowchart illustrating a method 1300 that supports indication of a random access transmission beam in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting a set of multiple uplink reference signals associated with a set of uplink beams, where each uplink reference signal of the set of multiple uplink reference signals is associated with a respective uplink beam of the set of uplink beams. The operations of 1305 may be performed in accordance with examples as disclosed herein. In some examples, aspects of the operations of 1305 may be performed by an uplink reference signal transmitter 725 as described with reference to FIG. 7.

At 1310, the method may include receiving, from a base station and at least in part in response to transmitting the set of multiple uplink reference signals, control signaling indicating one or more uplink beams from the set of uplink beams for the UE to use in a random access procedure. The operations of 1310 may be performed in accordance with examples as disclosed herein. In some examples, aspects of the operations of 1310 may be performed by a control signaling receiver 730 as described with reference to FIG. 7.

At 1315, the method may include transmitting a first random access message using an uplink beam selected based on the indication of the one or more uplink beams. The operations of 1315 may be performed in accordance with examples as disclosed herein. In some examples, aspects of the operations of 1315 may be performed by a random access message transmitter 735 as described with reference to FIG. 7.

Figure 14:
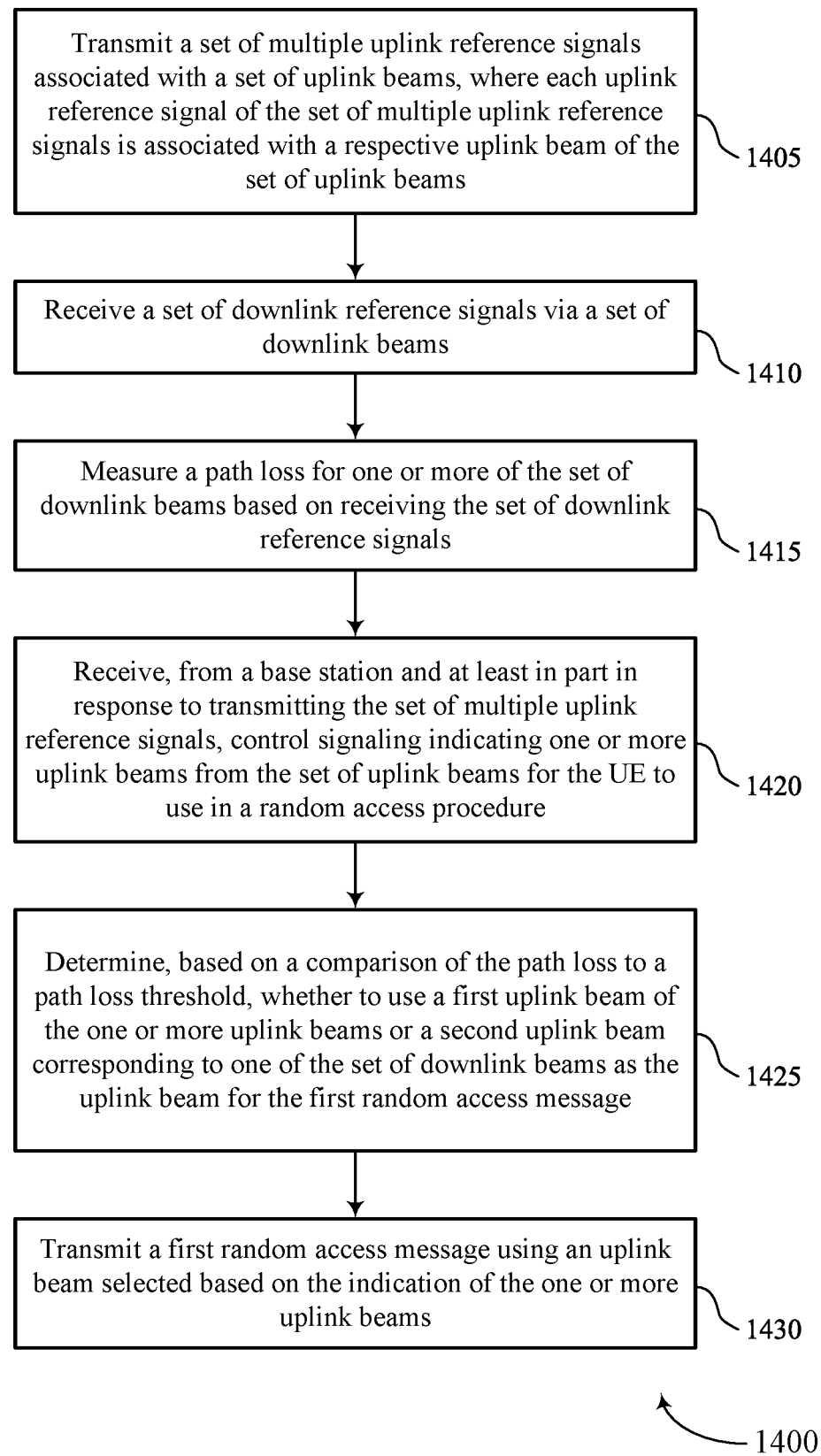

FIG. 14 shows a flowchart illustrating a method 1400 that supports indication of a random access transmission beam in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting a set of multiple uplink reference signals associated with a set of uplink beams, where each uplink reference signal of the set of multiple uplink reference signals is associated with a respective uplink beam of the set of uplink beams. The operations of 1405 may be performed in accordance with examples as disclosed herein. In some examples, aspects of the operations of 1405 may be performed by an uplink reference signal transmitter 725 as described with reference to FIG. 7.

At 1410, the method may include receiving a set of downlink reference signals via a set of downlink beams. The operations of 1410 may be performed in accordance with examples as disclosed herein. In some examples, aspects of the operations of 1410 may be performed by a downlink reference signal receiver 740 as described with reference to FIG. 7.

At 1415, the method may include measuring a path loss for one or more of the set of downlink beams based on receiving the set of downlink reference signals. The operations of 1415 may be performed in accordance with examples as disclosed herein. In some examples, aspects of the operations of 1415 may be performed by a path loss measurement component 745 as described with reference to FIG. 7.

At 1420, the method may include receiving, from a base station and at least in part in response to transmitting the set of multiple uplink reference signals, control signaling indicating one or more uplink beams from the set of uplink beams for the UE to use in a random access procedure. The operations of 1420 may be performed in accordance with examples as disclosed herein. In some examples, aspects of the operations of 1420 may be performed by a control signaling receiver 730 as described with reference to FIG. 7.

At 1425, the method may include determining, based on a comparison of the path loss to a path loss threshold, whether to use a first uplink beam of the one or more uplink beams or a second uplink beam corresponding to one of the set of downlink beams as the uplink beam for the first random access message. The operations of 1425 may be performed in accordance with examples as disclosed herein. In some examples, aspects of the operations of 1425 may be performed by a path loss comparison component 750 as described with reference to FIG. 7.

At 1430, the method may include transmitting a first random access message using an uplink beam selected based on the indication of the one or more uplink beams. The operations of 1430 may be performed in accordance with examples as disclosed herein. In some examples, aspects of the operations of 1430 may be performed by a random access message transmitter 735 as described with reference to FIG. 7.

Figure 15:
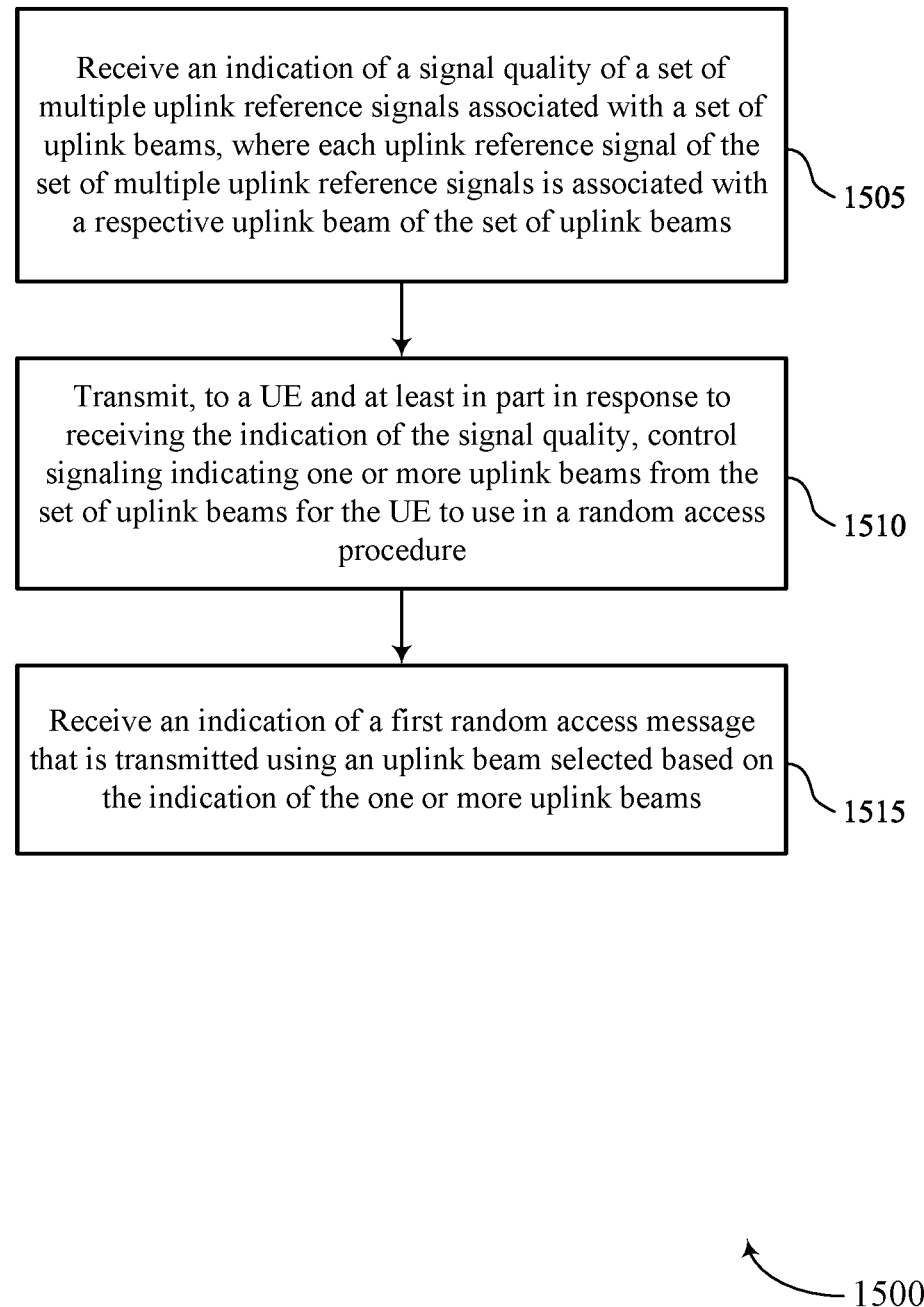

FIG. 15 shows a flowchart illustrating a method 1500 that supports indication of a random access transmission beam in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving an indication of a signal quality of a set of multiple uplink reference signals associated with a set of uplink beams, where each uplink reference signal of the set of multiple uplink reference signals is associated with a respective uplink beam of the set of uplink beams. The operations of 1505 may be performed in accordance with examples as disclosed herein. In some examples, aspects of the operations of 1505 may be performed by a signal quality indication receiver 1125 as described with reference to FIG. 11.

At 1510, the method may include transmitting, to a UE and at least in part in response to receiving the indication of the signal quality, control signaling indicating one or more uplink beams from the set of uplink beams for the UE to use in a random access procedure. The operations of 1510 may be performed in accordance with examples as disclosed herein. In some examples, aspects of the operations of 1510 may be performed by a control signaling transmitter 1130 as described with reference to FIG. 11.

At 1515, the method may include receiving an indication of a first random access message that is transmitted using an uplink beam selected based on the indication of the one or more uplink beams. The operations of 1515 may be performed in accordance with examples as disclosed herein. In some examples, aspects of the operations of 1515 may be performed by a random access message receiver 1135 as described with reference to FIG. 11.

Figure 16:
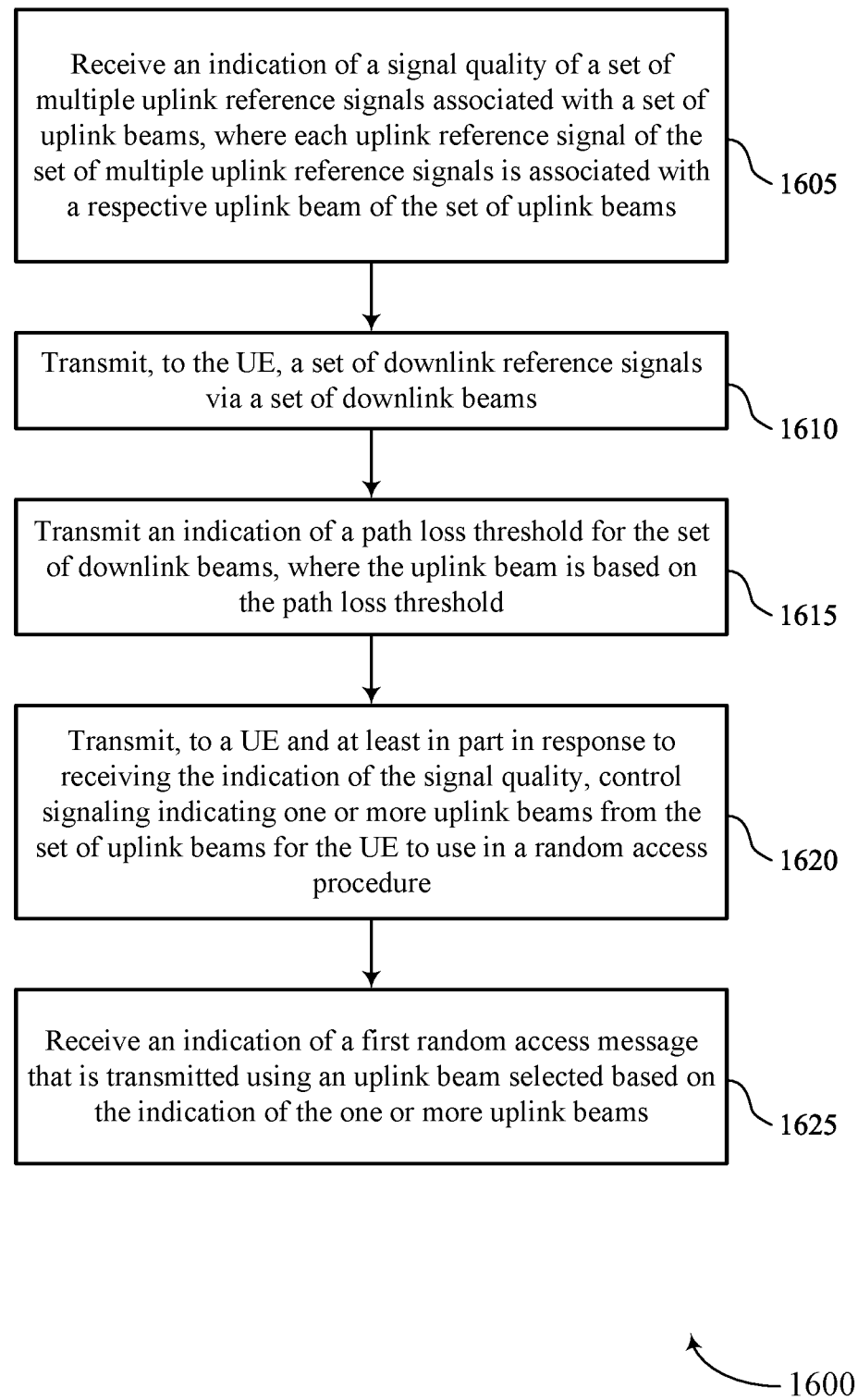

FIG. 16 shows a flowchart illustrating a method 1600 that supports indication of a random access transmission beam in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving an indication of a signal quality of a set of multiple uplink reference signals associated with a set of uplink beams, where each uplink reference signal of the set of multiple uplink reference signals is associated with a respective uplink beam of the set of uplink beams. The operations of 1605 may be performed in accordance with examples as disclosed herein. In some examples, aspects of the operations of 1605 may be performed by a signal quality indication receiver 1125 as described with reference to FIG. 11.

At 1610, the method may include transmitting, to the UE, a set of downlink reference signals via a set of downlink beams. The operations of 1610 may be performed in accordance with examples as disclosed herein. In some examples, aspects of the operations of 1610 may be performed by a downlink reference signal transmitter 1140 as described with reference to FIG. 11.

At 1615, the method may include transmitting an indication of a path loss threshold for the set of downlink beams, where the uplink beam is based on the path loss threshold. The operations of 1615 may be performed in accordance with examples as disclosed herein. In some examples, aspects of the operations of 1615 may be performed by a control signaling transmitter 1130 as described with reference to FIG. 11.

At 1620, the method may include transmitting, to a UE and at least in part in response to receiving the indication of the signal quality, control signaling indicating one or more uplink beams from the set of uplink beams for the UE to use in a random access procedure. The operations of 1620 may be performed in accordance with examples as disclosed herein. In some examples, aspects of the operations of 1620 may be performed by a control signaling transmitter 1130 as described with reference to FIG. 11.

At 1625, the method may include receiving an indication of a first random access message that is transmitted using an uplink beam selected based on the indication of the one or more uplink beams. The operations of 1625 may be performed in accordance with examples as disclosed herein. In some examples, aspects of the operations of 1625 may be performed by a random access message receiver 1135 as described with reference to FIG. 11.

The following provides an overview of aspects of the present disclosure:

Aspect 1: A method for wireless communication at a UE, comprising: transmitting a plurality of uplink reference signals associated with a set of uplink beams, wherein each uplink reference signal of the plurality of uplink reference signals is associated with a respective uplink beam of the set of uplink beams; receiving, from a base station and at least in part in response to transmitting the plurality of uplink reference signals, control signaling indicating one or more uplink beams from the set of uplink beams for the UE to use in a random access procedure; and transmitting a first random access message using an uplink beam selected based at least in part on the indication of the one or more uplink beams.

Aspect 2: The method of aspect 1, wherein receiving the control signaling indicating the one or more uplink beams comprises: receiving an indication of a set of random access occasions associated with the one or more uplink beams.

Aspect 3: The method of any of aspects 1 through 2, wherein receiving the control signaling indicating the one or more uplink beams is based at least in part on the UE being configured in a deployment configuration where uplink beams of the UE are decoupled from downlink beams of the UE.

Aspect 4: The method of any of aspects 1 through 3, wherein receiving the control signaling indicating the one or more uplink beams comprises: receiving an indication of a first set of uplink beams for the UE to use in a contention-based random access procedure; and receiving an indication of a second set of uplink beams for the UE to use in a contention-free random access procedure.

Aspect 5: The method of any of aspects 1 through 4, wherein receiving the control signaling indicating the one or more uplink beams comprises: receiving an indication of a first set of uplink beams for the UE to use in a two-step random access procedure; and receiving an indication of a second set of uplink beams for the UE to use in a four-step random access procedure.

Aspect 6: The method of any of aspects 1 through 5, wherein receiving the control signaling indicating the one or more uplink beams comprises: receiving an indication of a first set of uplink beams for the UE to use in a first type of random access procedure associated with a first triggering condition; and receiving an indication of a second set of uplink beams for the UE to use in a second type of random access procedure associated with a second triggering condition.

Aspect 7: The method of any of aspects 1 through 6, further comprising: receiving a set of downlink reference signals via a set of downlink beams; measuring a path loss for one or more of the set of downlink beams based at least in part on receiving the set of downlink reference signals; and determining, based at least in part on a comparison of the path loss to a path loss threshold, whether to use a first uplink beam of the one or more uplink beams or a second uplink beam corresponding to one of the set of downlink beams as the uplink beam for the first random access message.

Aspect 8: The method of aspect 7, further comprising: receiving an indication of the path loss threshold from the base station, wherein determining whether to use the first uplink beam or the second uplink beam is based at least in part on receiving the indication of the path loss threshold.

Aspect 9: The method of any of aspects 1 through 8, wherein the UE is configured with a first uplink carrier associated with a downlink carrier, the method further comprising: receiving control signaling indicating a second uplink carrier associated with the downlink carrier, the second uplink carrier configured for supplementary uplink; and determining to use one of the one or more uplink beams as the uplink beam for the first random access message based at least in part on determining to transmit the first random access message via the second uplink carrier.

Aspect 10: The method of any of aspects 1 through 9, wherein the one or more uplink beams comprise the uplink beam, the method further comprising: transmitting the first random access message using an accumulated timing advance associated with the one or more uplink beams.

Aspect 11: The method of any of aspects 1 through 10, further comprising: receiving a set of downlink reference signals via a set of downlink beams; and selecting the uplink beam based at least in part on the indication of the one or more uplink beams instead of based on the set of downlink beams.

Aspect 12: The method of any of aspects 1 through 11, wherein receiving the control signaling indicating the one or more uplink beams comprises: receiving an indication of one or more uplink reference signals of the plurality of uplink reference signals, each of the one or more uplink reference signals associated with a corresponding uplink beam of the one or more uplink beams.

Aspect 13: The method of any of aspects 1 through 12, further comprising: transmitting an indication of a UE capability for using an uplink beam that is unassociated with downlink beams used for communications between the base station and the UE, wherein receiving the indication of the one or more uplink beams is based at least in part the indication of the UE capability.

Aspect 14: The method of any of aspects 1 through 13, wherein transmitting the plurality of uplink reference signals comprises: transmitting the plurality of uplink reference signals via a supplementary uplink carrier or an uplink node in communication with the base station.

Aspect 15: A method for wireless communication at a base station, comprising: receiving an indication of a signal quality of a plurality of uplink reference signals associated with a set of uplink beams, wherein each uplink reference signal of the plurality of uplink reference signals is associated with a respective uplink beam of the set of uplink beams; transmitting, to a UE and at least in part in response to receiving the indication of the signal quality, control signaling indicating one or more uplink beams from the set of uplink beams for the UE to use in a random access procedure; and receiving an indication of a first random access message that is transmitted using an uplink beam selected based at least in part on the indication of the one or more uplink beams.

Aspect 16: The method of aspect 15, wherein transmitting the control signaling indicating the one or more uplink beams comprises: transmitting an indication of a set of random access occasions associated with the one or more uplink beams.

Aspect 17: The method of any of aspects 15 through 16, wherein transmitting the control signaling indicating the one or more uplink beams is based at least in part on the UE being configured in a deployment configuration where uplink beams of the UE are decoupled from downlink beams of the UE.

Aspect 18: The method of any of aspects 15 through 17, wherein transmitting the control signaling indicating the one or more uplink beams comprises: transmitting an indication of a first set of uplink beams for the UE to use in a contention-based random access procedure; and transmitting an indication of a second set of uplink beams for the UE to use in a contention-free random access procedure.

Aspect 19: The method of any of aspects 15 through 18, wherein transmitting the control signaling indicating the one or more uplink beams comprises: transmitting an indication of a first set of uplink beams for the UE to use in a two-step random access procedure; and transmitting an indication of a second set of uplink beams for the UE to use in a four-step random access procedure.

Aspect 20: The method of any of aspects 15 through 19, wherein transmitting the control signaling indicating the one or more uplink beams comprises: transmitting an indication of a first set of uplink beams for the UE to use in a first type of random access procedure associated with a first triggering condition; and transmitting an indication of a second set of uplink beams for the UE to use in a second type of random access procedure associated with a second triggering condition.

Aspect 21: The method of any of aspects 15 through 20, further comprising: transmitting, to the UE, a set of downlink reference signals via a set of downlink beams; transmitting an indication of a path loss threshold for the set of downlink beams, wherein the uplink beam is based at least in part on the path loss threshold.

Aspect 22: The method of any of aspects 15 through 21, further comprising: receiving an indication of a UE capability for using an uplink beam that is unassociated with downlink beams used for communications between the base station and the UE, wherein transmitting the indication of the one or more uplink beams is based at least in part the indication of the UE capability.

Aspect 23: The method of any of aspects 15 through 22, further comprising: receiving the indication of the signal quality of the plurality of uplink reference signals, the indication of the first random access message, or both, from an uplink node in communication with the base station.

Aspect 24: An apparatus for wireless communication at a UE, comprising a processor; memory coupled with the processor; and instructions stored in the memory and executable by the processor to cause the apparatus to perform a method of any of aspects 1 through 14.

Aspect 25: An apparatus for wireless communication at a UE, comprising at least one means for performing a method of any of aspects 1 through 14.

Aspect 26: A non-transitory computer-readable medium storing code for wireless communication at a UE, the code comprising instructions executable by a processor to perform a method of any of aspects 1 through 14.

Aspect 27: An apparatus for wireless communication at a base station, comprising a processor; memory coupled with the processor; and instructions stored in the memory and executable by the processor to cause the apparatus to perform a method of any of aspects 15 through 23.

Aspect 28: An apparatus for wireless communication at a base station, comprising at least one means for performing a method of any of aspects 15 through 23.

Aspect 29: A non-transitory computer-readable medium storing code for wireless communication at a base station, the code comprising instructions executable by a processor to perform a method of any of aspects 15 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting a plurality of uplink reference signals associated with a set of uplink beams, wherein each uplink reference signal of the plurality of uplink reference signals is associated with a respective uplink beam of the set of uplink beams;
    receiving, from a base station and at least in part in response to transmitting the plurality of uplink reference signals, control signaling indicating one or more uplink beams from the set of uplink beams for the UE to use in a random access procedure; and
    transmitting a first random access message using an uplink beam selected based at least in part on the indication of the one or more uplink beams.

2. The method of claim 1, wherein receiving the control signaling indicating the one or more uplink beams comprises:
    receiving an indication of a set of random access occasions associated with the one or more uplink beams.

3. The method of claim 1, wherein receiving the control signaling indicating the one or more uplink beams is based at least in part on the UE being configured in a deployment configuration where uplink beams of the UE are decoupled from downlink beams of the UE.

4. The method of claim 1, wherein receiving the control signaling indicating the one or more uplink beams comprises:
    receiving an indication of a first set of uplink beams for the UE to use in a contention-based random access procedure; and receiving an indication of a second set of uplink beams for the UE to use in a contention-free random access procedure.

5. The method of claim 1, wherein receiving the control signaling indicating the one or more uplink beams comprises:
receiving an indication of a first set of uplink beams for the UE to use in a two-step random access procedure; and
receiving an indication of a second set of uplink beams for the UE to use in a four-step random access procedure.

6. The method of claim 1, wherein receiving the control signaling indicating the one or more uplink beams comprises:
receiving an indication of a first set of uplink beams for the UE to use in a first type of random access procedure associated with a first triggering condition; and
receiving an indication of a second set of uplink beams for the UE to use in a second type of random access procedure associated with a second triggering condition.

7. The method of claim 1, further comprising:
receiving a set of downlink reference signals via a set of downlink beams;
measuring a path loss for one or more of the set of downlink beams based at least in part on receiving the set of downlink reference signals; and
determining, based at least in part on a comparison of the path loss to a path loss threshold, whether to use a first uplink beam of the one or more uplink beams or a second uplink beam corresponding to one of the set of downlink beams as the uplink beam for the first random access message.

8. The method of claim 7, further comprising:
receiving an indication of the path loss threshold from the base station, wherein determining whether to use the first uplink beam or the second uplink beam is based at least in part on receiving the indication of the path loss threshold.

9. The method of claim 1, wherein the UE is configured with a first uplink carrier associated with a downlink carrier, the method further comprising:
receiving control signaling indicating a second uplink carrier associated with the downlink carrier, the second uplink carrier configured for supplementary uplink; and
determining to use one of the one or more uplink beams as the uplink beam for the first random access message based at least in part on determining to transmit the first random access message via the second uplink carrier.

10. The method of claim 1, wherein the one or more uplink beams comprise the uplink beam, the method further comprising:
transmitting the first random access message using an accumulated timing advance associated with the one or more uplink beams.

11. The method of claim 1, further comprising:
receiving a set of downlink reference signals via a set of downlink beams; and
selecting the uplink beam based at least in part on the indication of the one or more uplink beams instead of based on the set of downlink beams.

12. The method of claim 1, wherein receiving the control signaling indicating the one or more uplink beams comprises:
receiving an indication of one or more uplink reference signals of the plurality of uplink reference signals, each of the one or more uplink reference signals associated with a corresponding uplink beam of the one or more uplink beams.

13. The method of claim 1, further comprising:
transmitting an indication of a UE capability for using an uplink beam that is unassociated with downlink beams used for communications between the base station and the UE, wherein receiving the indication of the one or more uplink beams is based at least in part the indication of the UE capability.

14. The method of claim 1, wherein transmitting the plurality of uplink reference signals comprises:
transmitting the plurality of uplink reference signals via a supplementary uplink carrier or an uplink node in communication with the base station.

15. A method for wireless communication at a base station, comprising:
receiving an indication of a signal quality of a plurality of uplink reference signals associated with a set of uplink beams, wherein each uplink reference signal of the plurality of uplink reference signals is associated with a respective uplink beam of the set of uplink beams;
transmitting, to a user equipment (UE) and at least in part in response to receiving the indication of the signal quality, control signaling indicating one or more uplink beams from the set of uplink beams for the UE to use in a random access procedure; and
receiving an indication of a first random access message that is transmitted using an uplink beam selected based at least in part on the indication of the one or more uplink beams.

16. The method of claim 15, wherein transmitting the control signaling indicating the one or more uplink beams comprises:
transmitting an indication of a set of random access occasions associated with the one or more uplink beams.

17. The method of claim 15, wherein transmitting the control signaling indicating the one or more uplink beams is based at least in part on the UE being configured in a deployment configuration where uplink beams of the UE are decoupled from downlink beams of the UE.

18. The method of claim 15, wherein transmitting the control signaling indicating the one or more uplink beams comprises:
transmitting an indication of a first set of uplink beams for the UE to use in a contention-based random access procedure; and
transmitting an indication of a second set of uplink beams for the UE to use in a contention-free random access procedure.

19. The method of claim 15, wherein transmitting the control signaling indicating the one or more uplink beams comprises:
transmitting an indication of a first set of uplink beams for the UE to use in a two-step random access procedure; and
transmitting an indication of a second set of uplink beams for the UE to use in a four-step random access procedure.

20. The method of claim 15, wherein transmitting the control signaling indicating the one or more uplink beams comprises:
transmitting an indication of a first set of uplink beams for the UE to use in a first type of random access procedure associated with a first triggering condition; and transmitting an indication of a second set of uplink beams for the UE to use in a second type of random access procedure associated with a second triggering condition.

21. The method of claim 15, further comprising:
transmitting, to the UE, a set of downlink reference signals via a set of downlink beams;
transmitting an indication of a path loss threshold for the set of downlink beams, wherein the uplink beam is based at least in part on the path loss threshold.

22. The method of claim 15, further comprising:
receiving an indication of a UE capability for using an uplink beam that is unassociated with downlink beams used for communications between the base station and the UE, wherein transmitting the indication of the one or more uplink beams is based at least in part the indication of the UE capability.

23. The method of claim 15, further comprising:
receiving the indication of the signal quality of the plurality of uplink reference signals, the indication of the first random access message, or both, from an uplink node in communication with the base station.

24. An apparatus for wireless communication at a user equipment (UE), comprising:
a processor;
memory coupled with the processor; and
instructions stored in the memory and executable by the processor to cause the apparatus to:
transmit a plurality of uplink reference signals associated with a set of uplink beams, wherein each uplink reference signal of the plurality of uplink reference signals is associated with a respective uplink beam of the set of uplink beams;
receive, from a base station and at least in part in response to transmitting the plurality of uplink reference signals, control signaling indicating one or more uplink beams from the set of uplink beams for the UE to use in a random access procedure; and
transmit a first random access message using an uplink beam selected based at least in part on the indication of the one or more uplink beams.

25. The apparatus of claim 24, wherein the instructions to receive the control signaling indicating the one or more uplink beams are executable by the processor to cause the apparatus to:
receive an indication of a set of random access occasions associated with the one or more uplink beams.

26. The apparatus of claim 24, wherein receiving the control signaling indicating the one or more uplink beams is based at least in part on the UE being configured in a deployment configuration where uplink beams of the UE are decoupled from downlink beams of the UE.

27. The apparatus of claim 24, wherein the instructions to receive the control signaling indicating the one or more uplink beams are executable by the processor to cause the apparatus to:
receive an indication of a first set of uplink beams for the UE to use in a contention-based random access procedure; and
receive an indication of a second set of uplink beams for the UE to use in a contention-free random access procedure.

28. An apparatus for wireless communication at a base station, comprising:
a processor;
memory coupled with the processor; and
instructions stored in the memory and executable by the processor to cause the apparatus to:
receive an indication of a signal quality of a plurality of uplink reference signals associated with a set of uplink beams, wherein each uplink reference signal of the plurality of uplink reference signals is associated with a respective uplink beam of the set of uplink beams;
transmit, to a user equipment (UE) and at least in part in response to receiving the indication of the signal quality, control signaling indicating one or more uplink beams from the set of uplink beams for the UE to use in a random access procedure; and
receive an indication of a first random access message that is transmitted using an uplink beam selected based at least in part on the indication of the one or more uplink beams.

29. The apparatus of claim 28, wherein the instructions to transmit the control signaling indicating the one or more uplink beams are executable by the processor to cause the apparatus to:
transmit an indication of a set of random access occasions associated with the one or more uplink beams.

30. The apparatus of claim 28, wherein transmitting the control signaling indicating the one or more uplink beams is based at least in part on the UE being configured in a deployment configuration where uplink beams of the UE are decoupled from downlink beams of the UE.

\* \* \* \* \*